United States Patent [19]

Kataoka et al.

[11] Patent Number: 5,444,310
[45] Date of Patent: Aug. 22, 1995

[54] APPARATUS FOR OPERATING DISCHARGE LAMPS

[75] Inventors: Shozo Kataoka, Hirakata; Masahito Ohnishi, Amagasaki, both of Japan

[73] Assignee: Matsushita Electric Works, Ltd., Osaka, Japan

[21] Appl. No.: 272,614

[22] Filed: Jul. 11, 1994

Related U.S. Application Data

[63] Continuation of Ser. No. 881,293, May 11, 1992, abandoned.

[30] Foreign Application Priority Data

May 15, 1991 [JP] Japan .................................. 3-109474
May 15, 1991 [JP] Japan .................................. 3-110625

[51] Int. Cl.6 ...................... H05B 37/00; H05B 39/00
[52] U.S. Cl. .................................. 307/125; 307/110; 315/209 R; 315/205
[58] Field of Search ........... 307/109, 110, 113, 132 R, 307/132 E, 125, 48, 49, 157; 363/62, 63; 315/209 R, 205, 241 R, DIG. 7, 246

[56] References Cited

U.S. PATENT DOCUMENTS

| | | | |
|---|---|---|---|
| 3,755,686 | 8/1973 | Woods | 307/29 |
| 3,956,638 | 5/1976 | Ahrens | 307/48 |
| 4,451,743 | 5/1984 | Suzuki et al. | 307/110 |
| 4,897,774 | 1/1990 | Bingham et al. | 307/110 |
| 5,309,065 | 5/1994 | Nuckolls et al. | 315/205 |

*Primary Examiner*—Todd Deboer
*Assistant Examiner*—Peter Ganjoo
*Attorney, Agent, or Firm*—Leydig, Voit & Mayer

[57] ABSTRACT

An apparatus for operating discharge lamps with a stable electric current supply and minimal dimensional area requirements. The apparatus includes an input power source coupled across a capacitor, establishing a first loop circuit. A discharge lamp may also be connected across the capacitor, thereby forming a second loop circuit. A first switch repeatedly turns ON and OFF, making and breaking the first loop circuit at a first frequency, and thereby charges the capacitor. A second switch repeatedly turns ON and OFF, making and breaking the second loop circuit at a second frequency, and thereby discharges the capacitor through the discharge lamp. A control mechanism controls the first and second switches for supplying a predetermined current to the discharge lamp for flickerless operation.

17 Claims, 28 Drawing Sheets

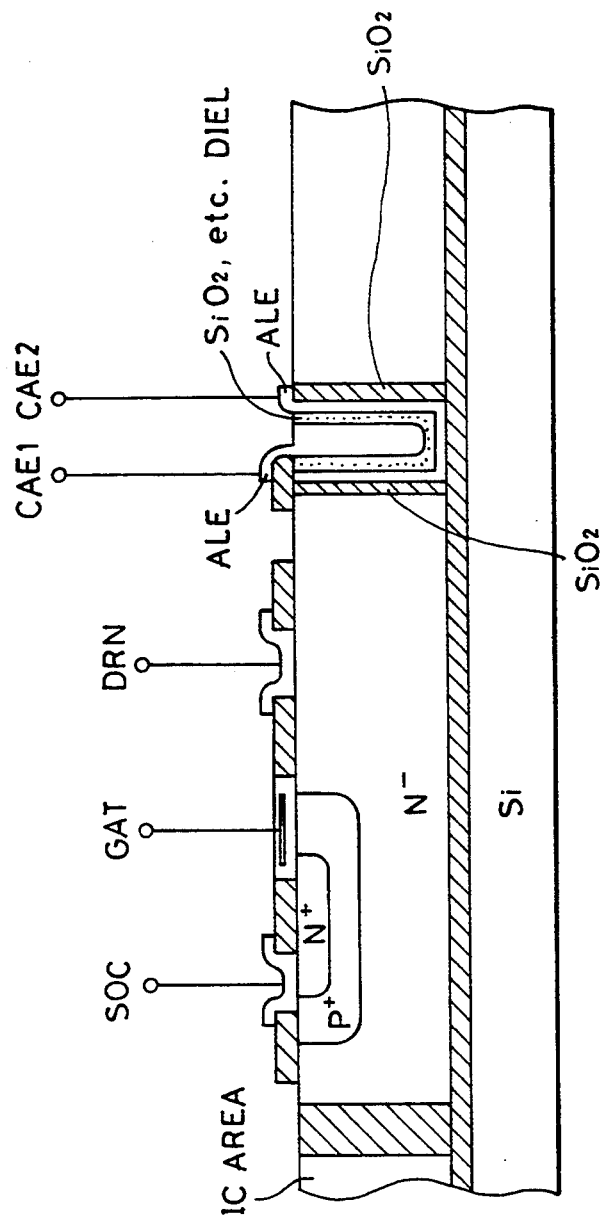

APPARATUS FOR OPERATING DISCHARGE LAMPS

This application is a continuation of application Ser. No. 07/881,293, filed May 11, 1992, now abandoned.

BACKGROUND OF THE INVENTION

This invention relates to apparatus for operating discharge lamps and, more particularly, to an apparatus for operating discharge lamps with a plurality of switches as well as capacitors employed for stably supplying a predetermined current to the discharge lamp.

DESCRIPTION OF RELATED ART

Hitherto, there has been suggested an arrangement in which a power is supplied to a load through a capacitor employed for the purpose of stabilizing the power supply. In U.S. Pat. No. 3,263,099 to Burnice D. Bedford, for example, there is disclosed a power amplifier circuit in which a series circuit of an inductor and a switch is connected to a power source, energy is stored in the inductor upon turning ON of the switch, the stored energy in the inductor is charged in a capacitor through a diode upon turning OFF of the switch and this energy is also supplied to a load. While this circuit allows the power supply to the load to be controlled by means of ON duty of the switch, it is indispensable that the inductor is employed so that there is involved such problem that, when in particular an input voltage is high, it is required to use a larger inductor so that the circuit and eventually an apparatus in which the circuit is incorporated can hardly be minimized.

In U.S. Pat. No. 4,513,364 to Ole K. Nilssen, further, there is disclosed a circuit in which an AC source power is stored as rectified in a capacitor, two switches are turned alternately ON and OFF with the capacitor as a power source so that an AC voltage is supplied to a resonance circuit comprising an inductor, condenser and discharge lamp, and a current to the discharge lamp is controlled with an action of the inductor connected in series with the discharge lamp. In this circuit, it is made possible to vary a current limiting impedance due to the inductor by varying operational frequency of the switches so as to control the power supply to the discharge lamp. The requirement of the use of the inductor, however, still involves a drawback particularly in the difficulty in attaining the dimensional minimization.

In another U.S. Pat. No. 3,657,598 to Osamu Nomura et al, on the other hand, there is disclosed an apparatus for operating discharge lamps in which two switches and a capacitor as a reactance are used in an arrangement in which ON and OFF control signals having the same OFF period are alternately supplied from a control circuit to the respective switches so that the two switches will not be made to turn ON simultaneously. While in this device the size minimization may be attempted by increasing the operational frequency, the discharge lamp current is made to vary according to ON time so that, in controlling the power supply to the discharge lamp while controlling ON time of the two switches with the control signals, a complicated current detecting and controlling means is required to be employed for a stable control of the discharge lamp current so as to cause a problem to arise in that manufacturing costs are made high.

Further, a circuit employing the switch and capacitor is disclosed in Japanese Utility Model Laid-Open Publication No. 49-6114 of Iwao Fukuda, in which two switches alternately turned ON and OFF a voltage dropping means comprising a diode and capacitor are employed for providing a voltage which is given as source voltage divided by the number of the capacitor, and a dimensional minimization may be attainable if the operational frequency is set high. In this circuit of Fukuda, the switches are so provided that their "ON" operation will not be complete so that power supply rate to a load connected to this circuit will be varied. When the power supply to the load is to be made stable, on the other hand, there arises a problem that power loss upon the ON operation of the switches is increased and efficiency is decreased.

SUMMARY OF THE INVENTION

It is a primary object of the present invention, therefore, to provide an apparatus for operating discharge lamps of an arrangement employing no inductor but a plurality of switches and capacitors for allowing the dimensions to be minimized and the apparatus to be optimumly formed in one chip.

According to the present invention, this object can be realized by an apparatus for operating discharge lamps in which a first power source is connected at both ends thereof to a capacitor means acting as a second power source, a capacitor charging means comprising at least a first switch turned repeatedly ON and OFF at a high speed in inserted in a closed loop of the first power source and capacitor means as the second power source, a discharge lamp is connected across the capacitor means acting as the second power source, a capacitor discharge means comprising at least a second switch turned repeatedly ON and OFF at a high speed is inserted in a closed loop of the capacitor means and discharge lamp, and means is connected to the first and second switches for controlling their ON and OFF operation at a high speed so that the switches will not be simultaneously turned ON, characterized in that the control means is so arranged that the first switch is turned ON when the second switch is in the OFF state to have a charge stored in the capacitor means as the second power source while the second switch is turned ON when the first switch is in the OFF state to have the stored charge in the capacitor means discharged until substantial termination of the lamp current flowing through the discharge lamp, and the first and second switches are controlled to be turned ON and OFF at a high speed for supplying a predetermined lamp current to the discharge lamp.

Other objects and advantages of the present invention shall be made clear in following description of the invention detailed with reference to preferred embodiments shown in accompanying drawings.

BRIEF DESCRIPTION OF THE DRAWINGS

FIGS. 65A and 65B are diagrams showing more practical structures of the apparatus shown in particular in FIG. 7.

Figure 1:
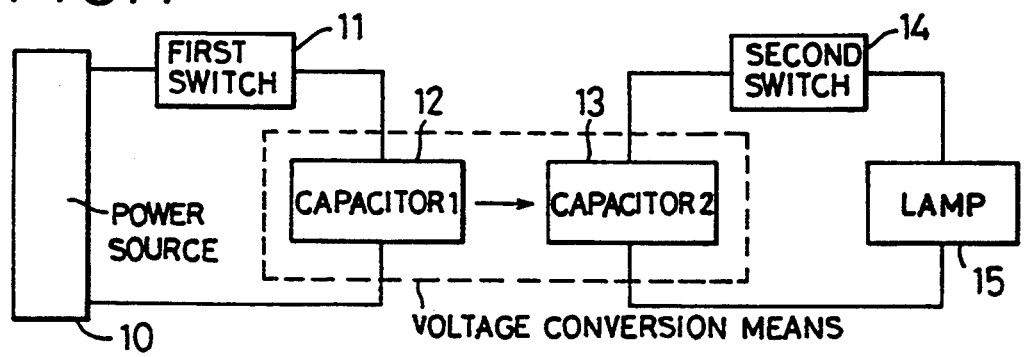
FIG. 1 is a block circuit diagram showing a basic arrangement of the apparatus for operating discharge lamps according to the present invention.

While the present invention shall now be described in detail with reference to the respective embodiments shown in the drawings, it will be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Referring to FIG. 1, there is shown a basic arrangement of the apparatus for operating discharge lamps according to the present invention, in which a power source 10, for example, a DC power source as a first power source is connected in parallel to a series circuit of first switch 11 and first capacitor 12, while a second capacitor 13 is connected in parallel to a series circuit of second switch 14 and a discharge lamp 15 as a light source. In the present instance, the first and second capacitors 12 and 13 are linked to each other through a proper voltage conversion means when there is a difference in the operating voltage between the source 10 and the discharge lamp 15, and the second capacitor 13 functions as a second power source with respect to the discharge lamp 15.

More practically, the first switch 11 turned ON causes the first capacitor 12 to be charged, a charging voltage of which is converted through the voltage conversion means to a voltage on an optimum level and is stored in the second capacitor 13 and, then, the second switch 14 is turned ON until a lamp current from this second capacitor 13 into the discharge lamp 15 becomes substantially zero. With this respect that the lamp current supply from the second capacitor 13 becomes zero, there can be attained a current limiting effect. Each period in which the lamp current is supplied from the second capacitor 13 to the discharge lamp 15 until the same becomes substantially zero is made one cycle, and it is made possible to supply a predetermined current stably to the discharge lamp by controlling the number of cycles, while realizing the current limiting effect with respect to the discharge lamp 15. Further, with a higher operating frequency for the current supply, the capacitance of the first and second capacitors 12 and 13 can be minimized, so as to be effectively contributive eventually to a dimensional minimization of the apparatus.

Various embodiments of the apparatus for operating discharge lamps according to the present invention shall be described in the followings in the sequence of respective instances where the source voltage is substantially the same as the operating voltage of the discharge lamp, where the operating voltage is higher than the source voltage, where the operating voltage is lower than the source voltage, and where the operating voltage varies to be higher and lower than the source voltage. In addition, references shall be also made sequentially to various examples in which the power supply to the discharge lamp is made changeable in the polarity, in which a plurality of the power sources are employed, in which a plurality of loads are employed, and in which means for causing a continuous current to flow to the discharge lamp is employed.

EXAMPLE 1

Figure 2:
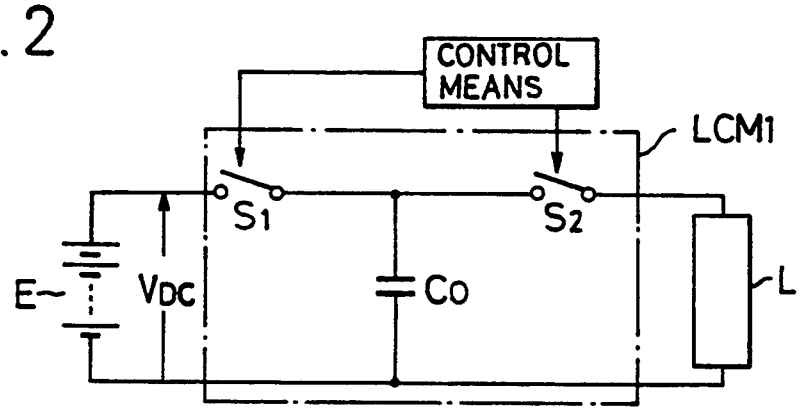
FIG. 2 shows in a circuit diagram a first embodiment of the apparatus according to the present invention.

In FIG. 2, there is shown a first embodiment of the apparatus for operating discharge lamps which is effectively employable in the instance where the operating voltage of the discharge lamp and the source voltage are substantially the same with each other. In the present embodiment, a series circuit of the first and second switches S1 and S2 is connected to a DC power source E as the first power source, a capacitor Co is inserted as connected at one end to a junction point of the first and second switches S1 and S2, and a discharge lamp L is connected on the other side of the second switch S2. The connection is so made that the first switch S1 contributes to a charging of the capacitor Co while the second switch S2 contributes to a discharging of the capacitor Co, and the first and second switches S1 and S2 are controlled by a control means to be alternately turned ON and OFF and not to be simultaneously turned ON. The capacitor Co is to function as if a power source with respect to the discharge lamp L at the time when made to be discharged, and as if a second power source with respect to the first DC power source E.

Figure 3A:
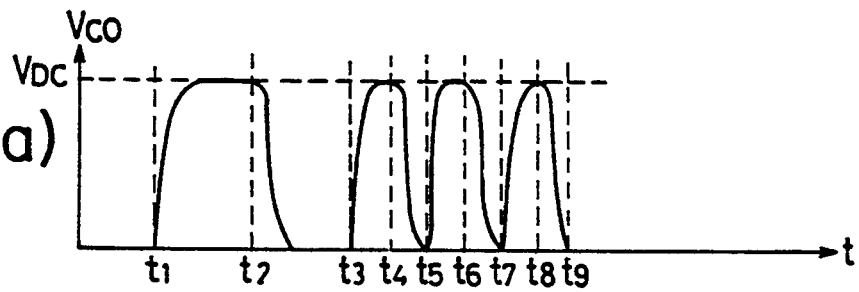
FIG. 3 shows in waveform diagrams the operation at significant parts in the circuit of FIG. 2.
Figure 3B:
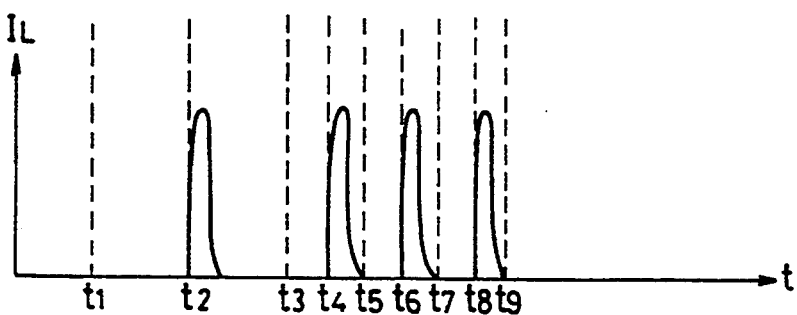

Referring also to waveform diagrams (a) and (b) of FIG. 3, the first switch S1 for the charging causes, as turned ON at time t1, the capacitor Co to be charged with a voltage of the DC power source E, a voltage $V_{CO}$ of the capacitor Co reaches the voltage $V_{DC}$ of the DC power source E shortly after the time t1 (diagram (a) of FIG. 3), upon which the first switch S1 is turned OFF to maintain the value of the charging voltage. Next, the second switch S2 for the discharging is turned OFF at time t2, whereby a charge stored in the capacitor Co is discharged through the discharge lamp L to have the lamp L operated for a moment and, as the discharge terminates, the control means turns the second switch S2 for the discharging to be OFF. Following this and after time t3, the same operation is repeated, that is, a discharge current of the capacitor Co is made to be a pulse shape (diagram (b) of FIG. 3). Here, the waveform (b) of FIG. 3 shows with an exaggeration a waveform obtained in an event where the circuit is constituted by practical elements, in which the waveform is given in a somewhat dulled shape due to resistance components of the switches and wiring. With the first and second switches S1 and S2 operated by the control means so as to render the pulse intervals to be smaller, the discharge lamp L is operated as if the lamp is emitting light continuously.

Figure 4:
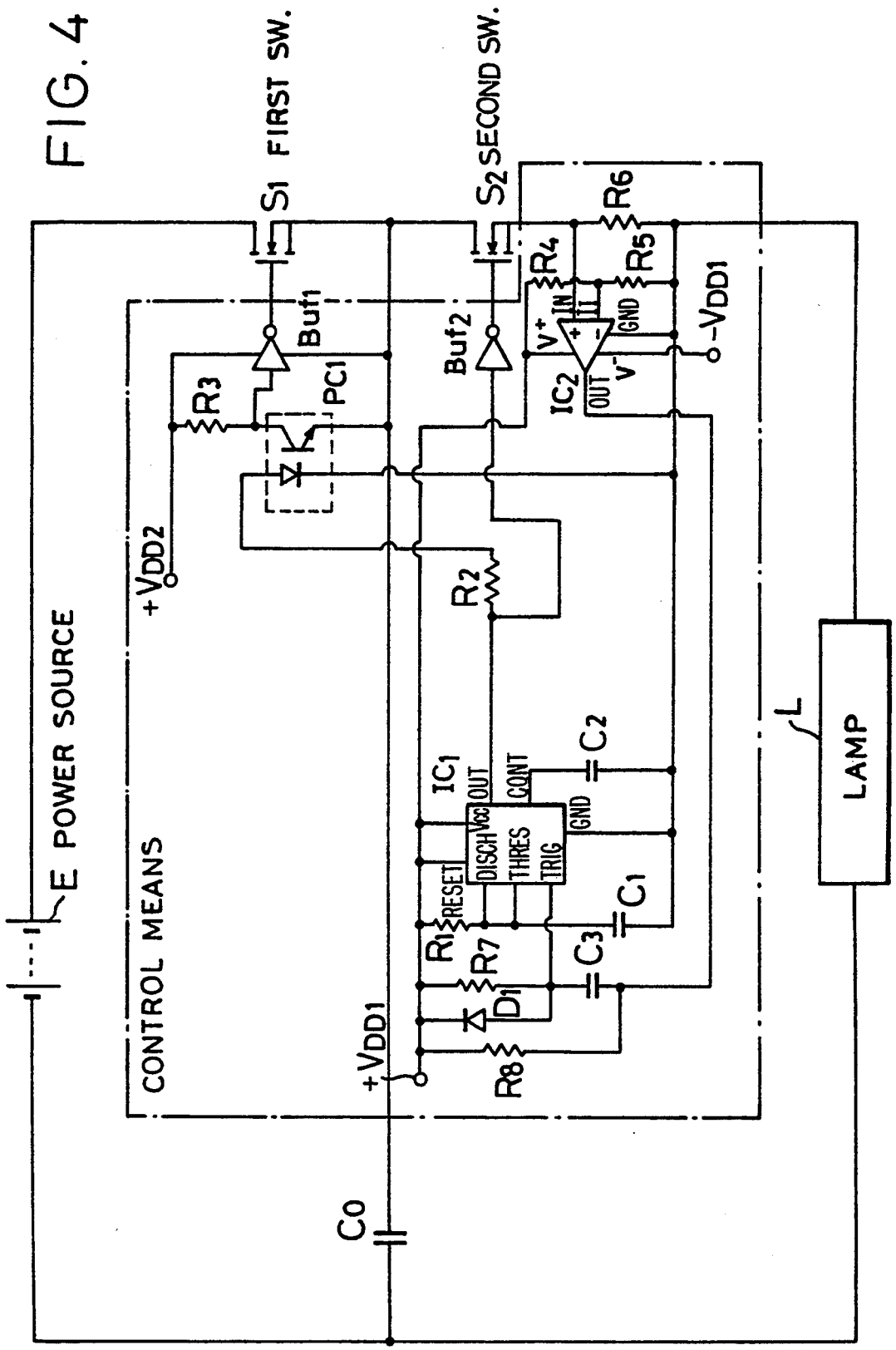
FIG. 4 shows in a circuit diagram an example of the control means employed in the embodiment of FIG. 2.

For the control means in respect of such discharge lamp operating means LCM1 as shown in FIG. 2, there is shown in FIG. 4 an employable example of the control means, in which a timer $IC_1$ (preferably SE555 or the like) and a comparator $IC_2$ (preferably μPC319 or the like) are included. While in this case the second switch S2 turned ON causes a current to flow through a resistor R6 to the discharge lamp L, a voltage at $I_I$ terminal of the comparator $IC_2$ so set by resistors R4 and R5 as to be only slightly on plus side (to be almost zero) causes a voltage at the other $I_N$ terminal of the comparator $IC_2$ due to a voltage generated at the resistor R6 to be higher than the voltage at the $I_I$ terinal, an output terminal OUT of the comparator $IC_2$ is thereby made open, and voltage at a capacitor C3 is discharged through a diode D1 and a resistor R8.

As the current from the capacitor Co to the discharge lamp L is gradually decreased and the lamp current becomes substantially zero, the voltage across the resistor R6 is made zero, the voltage at the $I_N$ terminal of the comparator $IC_2$ becomes lower than the voltage at the terminal $I_I$, and the output terminal OUT of the comparator $IC_2$ is made to be at GND level. Since at this time the charge in the capacitor C3 is being discharged, a trigger signal is provided to a TRIG terminal of the timer $IC_1$, and the charge in the capacitor C3 is increased through a resistor R7. The timer $IC_1$ starts a timer operation, the output terminal OUT is made to be at a high level by a time constant of a resistor R1 and capacitor C1, an output of buffer Buf1 is made at a high level through a resistor R2, photocoupler PC1 and resistor R3, to have the first switch S1 turned ON, and the capacitor Co is thereby charged. At the same time, the second switch SW2 is turned OFF by a buffer Buf2, the output terminal OUT of the timer $IC_1$ is made to be at a low level after a lapse of time determined by the time constant of the resistor R1 and capacitor C1, the first switch S1 is thereby turned OFF and the second switch S2 is turned ON, whereby a current is made to flow again from the capacitor Co to the discharge lamp L. A repetition of this operation allows the discharge lamp L to be smoothly operated.

In the foregoing arrangement, a repeating frequency of the power supply from the capacitor Co to the discharge lamp L, that is, the operation frequency of the second switch SW2 is set to be higher than a critical fusion frequency, so that the operating of the discharge lamp L with the repeated discharges can be made in a state involving no flicker, allowing any person not to feel any variation in the brightness in visual recognition. Here, the critical fusion frequency is a lower limit of the repeating frequency at which the cycle of the brightness variation in the discharge lamp L is made short enough for eliminating any impression of the flicker, that is, quickly repeated lighting on and off and appearing as if being continuously operated, which limit is approximately several ten Hz in general. Further, when the operation frequency of the first and second switches S1 and S2 is selected to be a quotient of energy supplied to the discharge lamp L as divided by a suppliable energy in the one cycle from the capacitor Co to the discharge lamp L, it will be then possible to stably supply a predetermined energy to the discharge lamp L while effectively executing the current limiting with the energy from the capacitor Co to the discharge lamp L made absent.

When the operation frequency is set higher, it is then made possible to execute the intended operation with the capacitor Co made smaller in the capacity. In the apparatus for operating discharge lamps shown in FIG. 2, for example, a operation of a 4 W fluorescent lamp (a product FL4W by Japanese Corporation Matsushita Electric Industrial Co., Ltd.) with a source voltage of 70 V and the operation frequency of about 1 MHz will allow the capacitor Co to be of such small capacitor as to be about 1600 pF, so that a predetermined energy can be supplied to the discharge lamp by means of an extremely small and simple control means. In the present instance, it is also possible that, instead of direct detection of termination of the discharge of the capacitor Co, the time at which the second switch S2 is turned OFF is preliminarily set to be at the time when the discharging terminates.

It should be appreciated that the foregoing control means can be effectively employed in any one of the embodiments described in the followings.

EXAMPLE 2

Figure 5:
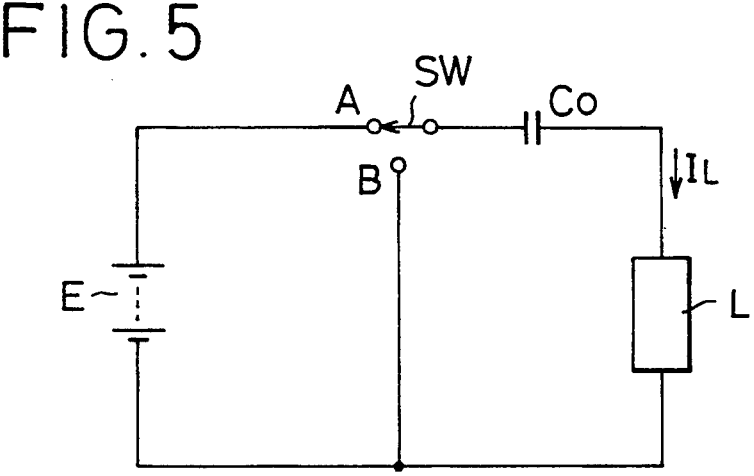
FIG. 5 shows in a circuit diagram a second embodiment of the apparatus according to the present invention.
Figure 6:
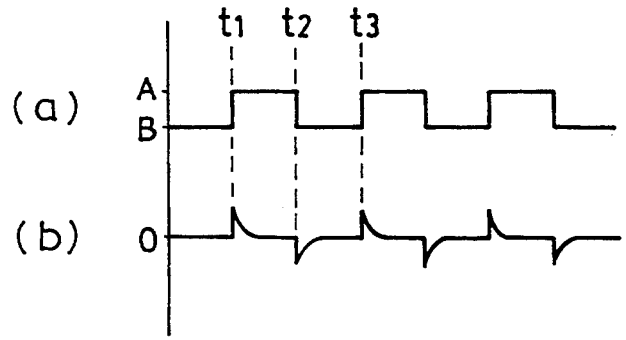
FIG. 6 shows in waveform diagrams the operation at significant parts in the circuit of FIG. 5.

The apparatus for operating discharge lamps in a second embodiment shown in FIG. 5 comprises a series circuit of a switch SW having two switching contacts A and B, capacitor Co and discharge lamp L, and this series circuit is connected in parallel relationship to the DC power source E. In this case, an operation at time t1 as shown in a waveform (a) of FIG. 6 of the switch SW onto the side of the contact A through such optimum control means (not shown here) as in the foregoing causes such lamp current $I_L$ as shown by a waveform (b) of FIG. 6 to flow to the discharge lamp L from the DC power source E while charging the capacitor Co. As the switch SW is operated at time t2 next to be turned onto the other contact B side, the charge stored in the capacitor Co is discharged through the discharge lamp L, the switch SW is kept on the contact B side until the termination of the current flowing through the discharge lamp L, and the lamp current $I_L$ in a direction reverse to that of the foregoing current is caused to flow to the discharge lamp L. After time t3, such operation of the switch SW as above is repeated, and the discharge lamp L can be smoothly operated in an alternating current mode.

In this embodiment of FIG. 5, too, the switch SW turned onto the contact A side causes the capacitor Co to be charged while the switch SW turned onto the contact B side executes the discharging of the capacitor Co, the contact B side state of the switch SW is maintained until the substantial termination of the current to the discharge lamp so as to perform the current limiting effect while controlling the repeated number of the charging and discharging, and the discharge lamp can be supplied stably with the predetermined current. In this case, it will be appreciated that the switch SW having two switching contacts functions in a manner closely resembling that of the foregoing first and second switches S1 and S2. While in the present embodiment the DC power source is employed as the first power source, a use of AC power source allows substantially the same operation to be attained.

EXAMPLE 3

Figure 7:
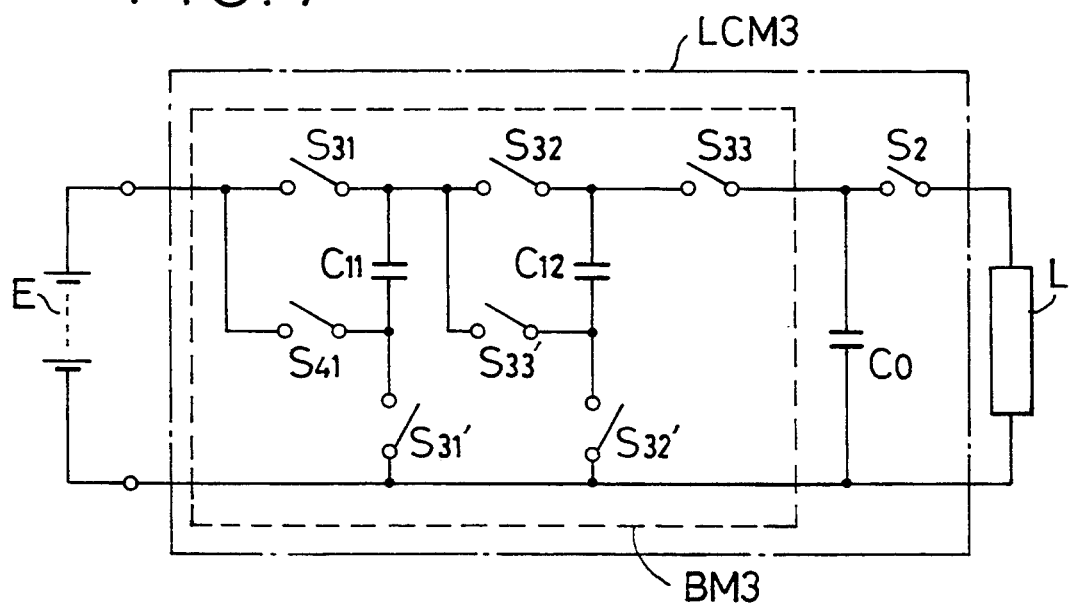
FIG. 7 shows in a circuit diagram a third embodiment of the apparatus according to the present invention.

In FIG. 7, there is shown a third embodiment of the apparatus for operating discharge lamps which is useful when employed in the instance where the operating voltage of the discharge lamp is higher than the source voltage, and the apparatus comprises a operating means LCM3 including means BM3 for boosting the source voltage $V_{DC}$ of the DC power source E. In this boosting means BM3, a series circuit of a switch S3, capacitor C11 and switch S31' interlocked with the switch S31 is connected to the DC power source E in parallel relationship thereto, a further series circuit of a switch S32, capacitor C12 and switch S32' interlocked with the switch S32 is connected through the switch S31 to the source E in parallel thereto, and a further switch S33 is connected in series to the switches S31 and S32, while the capacitor Co is connected through the series circuit of the switches S31–S33 to the DC power source E. A further switch S41 made ON as interlocked with ON operation of the switches S32 and S33 is connected in parallel to a series circuit of the switch S31 and capacitor C11, and a still further switch S33' interlocking with the switch S33 is connected in parallel to a series circuit of the switch S32 and capacitor C12.

Figure 8:
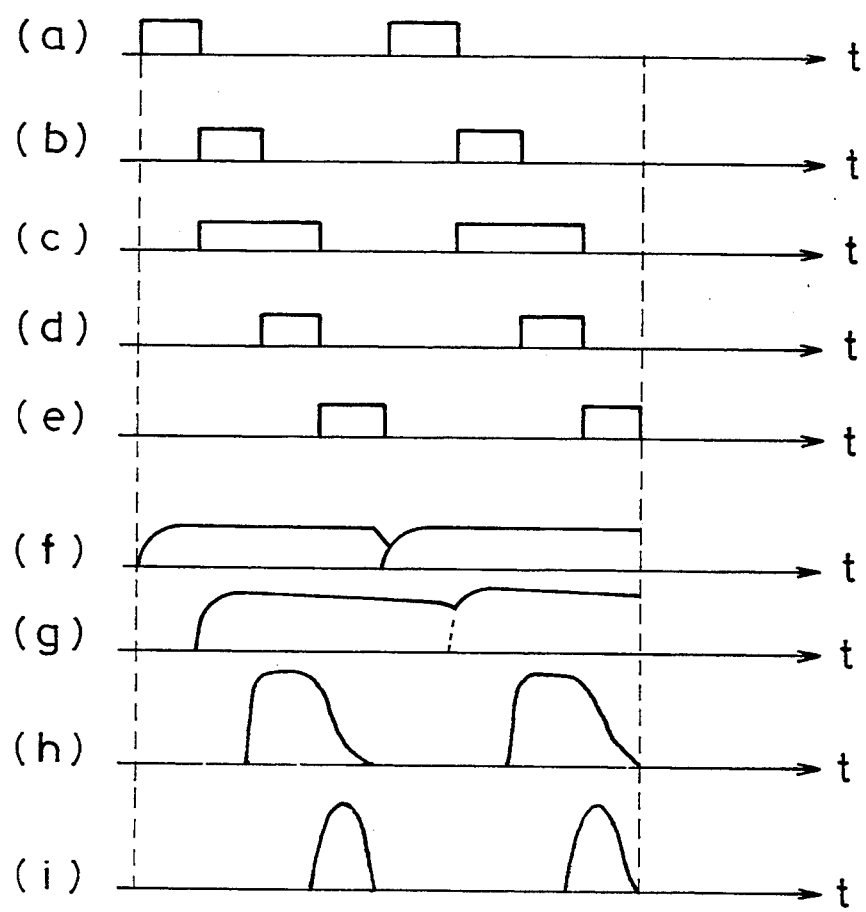
FIG. 8 shows in waveform diagrams the operation at significant parts in the circuit of FIG. 7.

Referring also to waveform diagrams (a) through (i) of FIG. 8, simultaneous turning ON of the switches S31 and S31' as in the waveform (a) causes the capacitor C11 to be charged by the source voltage $V_{DC}$ of the DC power source E as indicated by the waveform (f). Next, when the switches S31 and S31' are turned OFF while the switches S32, S32' and S41 are turned ON as in the waveforms (b) and (c), the capacitor C12 is charged through a series circuit of the DC power source E and capacitor C11 so as to be of a voltage twice as high as the voltage $V_{DC}$ of the DC power source E as shown in the waveform (g). Next, as the switches S32 and S32' are turned OFF while the switches S33 and S33' are turned ON as in (d), the capacitor Co is charged through a series circuit of the DC power source E and capacitors C11 and C12, so as to be of a voltage four times as high as the voltage $V_{DC}$ of the DC power source E. In this case, the switches S33 and S33' are to constitute the charging switch in the operating means LCM3. As shown in (h), the voltage of capacitor Co will be $V_{CO}=2^{n-1}V_{DC}$ (n being the number of capacitors). In addition, the turning OFF of the switches S33, S33' and S41 and the turning ON of the discharging switch S2 as in (e) cause the stored charge in the capacitor Co to be discharged to the discharge lamp L, whereby the lamp current $I_L$ is made to flow to the lamp as in (i), and the discharge lamp L can be smoothly operated.

Here, while the number of the capacitors including the capacitors C11 and C12 in the boosting means BM3 is three, it is possible to increase the number of the capacitors in the boosting means BM3 as well as the number of the switches so as to further boost the DC voltage, and the discharge lamp L of a higher lamp voltage than the voltage $V_{DC}$ of the DC power source E can be effectively operated. It is also possible to omit the capacitor Co in the operating means LCM3 and to have its function, that is, the function as the second power source with respect to the first DC power source E, achieved by the capacitors C11 and C12. In this case, these capacitors should preferably be C11 C12 in the capacity. When in the present embodiment a higher voltage is required for starting or the like of the discharge lamp L, the boosting operation with the boosting means BM3 is fully performed, but, in an event where the output voltage may be of a low level after the starting, the switches S32 and S32' are fixed respectively at ON and OFF states, then the discharge lamp L can be maintained in a state of being operated with a voltage twice as high as the voltage $V_{DC}$ of the DC power source E, which state is contributive to an improvement in the circuit efficiency and the minimization in the capacity of the capacitor C12.

EXAMPLE 4

Figure 9:
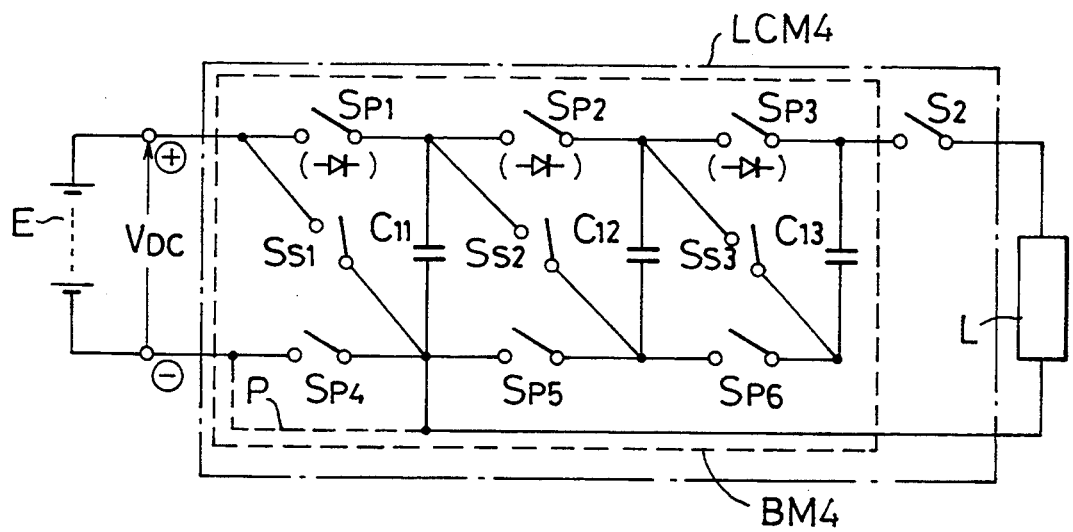
FIG. 9 shows in a circuit diagram a fourth embodiment of the apparatus according to the present invention.
Figure 10A:
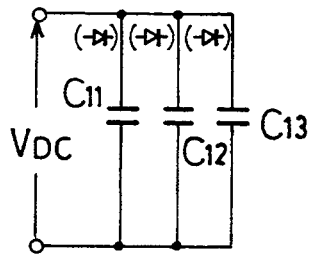
FIGS. 10A and 10B are circuit diagrams equivalent to parts in the circuit of FIG. 9.
Figure 10B:
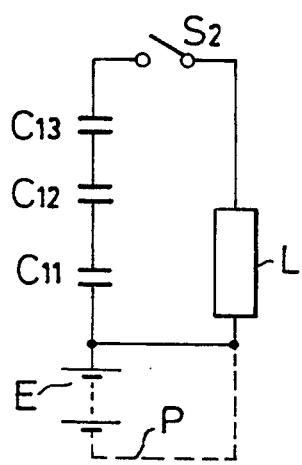

A fourth embodiment of the apparatus for operating discharge lamps shown in FIG. 9 is also useful as employed in the instance where the operating voltage of the discharge lamp is higher than the source voltage. In the boosting means BM4 of the operating means LCM4 of this embodiment, the switches $S_{P1}$ to $S_{P6}$ for the parallel connection are turned ON while the switches $S_{S1}$ to $S_{S3}$ for the series connection are turned OFF with the discharging switch S2 also turned OFF, then the capacitors C11 to C13 are put into such parallel connected state with respect to the DC power source E as shown in FIG. 10A and the capacitors are charged up to the voltage $V_{DC}$ of the DC power source E. When the switches $S_{P1}$ to $S_{P6}$ for the parallel connection are turned OFF and the switches $S_{S1}$ to $S_{S3}$ for the series connection are turned ON, next, the capacitors C11 to C13 are placed into a series connection with respect to the DC power source E in a state of being charged as shown in FIG. 10B. When the discharging switch S2 is turned ON next, the charges in the three capacitors C11 to C13 are discharged to the discharge lamp L, and the lamp can be smoothly operated.

Here, such a path P as shown by a broken line in FIG. 10B in particular may be used in an event when the application of the voltage $V_{DC}$ of the DC power source E to the three capacitors C11 to C13 is to be properly modified. When, for example, an application of a high voltage is required upon the starting or the like of the discharge lamp L, the DC power source E is connected, through the path P, in series to the series circuit of the capacitors C11 to C13, while this connecting state through the path P is made exchangeable so as to eliminate the DC power source E at the time when the lamp voltage is lowered after the starting of the discharge lamp L. In this fourth embodiment, the capacitors C11 to C13 may be of the same capacity, and the apparatus is made easier in the circuit design.

While in the fourth embodiment the references have been made to the switches for the parallel connection as being six and to the switches for the series connection, switches for the discharging and capacitors for the discharging as being respectively three, they may be properly increased to boost up the voltage $V_{DC}$ of the DC power source E to a desired multiple, and the apparatus can be utilized to a wide extent of the various discharge lamps from a high watt number to a low watt number. For the switches $S_{P1}$ to $S_{P6}$ for the parallel connection as employed in the boosting means BM4, it may be also possible to use diodes. Further, the arrangement may be also modified so that, instead of using the path P the connecting state of which can be modified, the output voltage of the boosting means BM4 is converted by turning the parallel connecting switch $S_{P3}$ ON but the switch $S_{P6}$ OFF and turning the series connecting switch $S_{S3}$ OFF after the starting of the discharge lamp L in the same manner as in the above.

EXAMPLE 5

Figure 11:
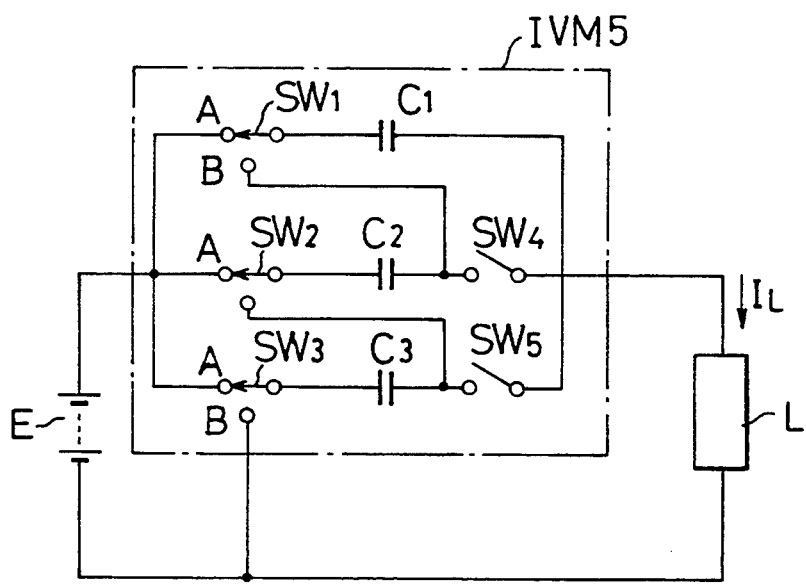
FIG. 11 is a circuit diagram showing a fifth embodiment of the apparatus according to the present invention.
Figure 12:
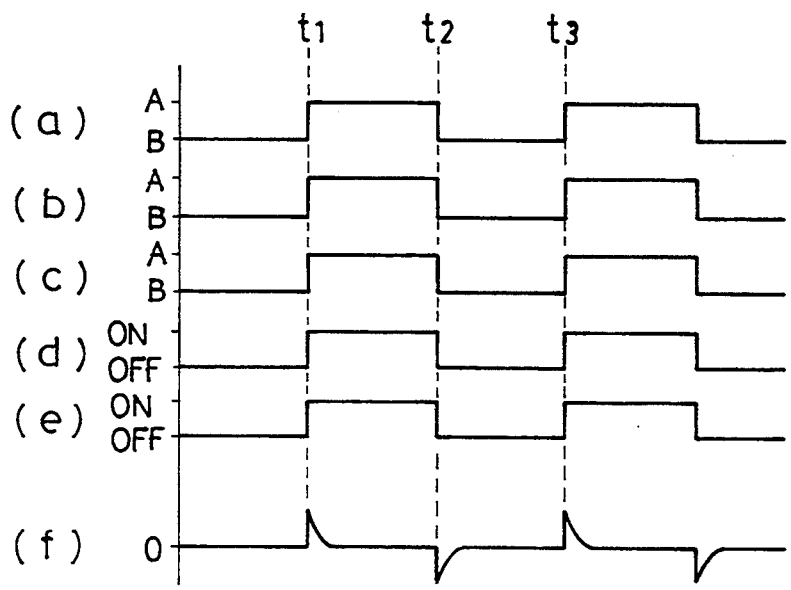
FIG. 12 shows in waveform diagrams the operation at significant positions in the circuit of FIG. 11.

A fifth embodiment shown in FIG. 11 of the apparatus for operating discharge lamps is also useful when employed in the instance where the operating voltage of the discharge lamp is higher than the source voltage, and the apparatus of this embodiment comprises a voltage converting means IVM5. Referring also to waveform diagrams (a) through (f) of FIG. 12, the voltage converting means IVM5 so operates that, at time t1, switches SW1 to SW3 are turned onto contact A side as shown in the waveforms (a) to (c) while switches SW4 and SW5 are turned ON as shown in (d) and (e) to have respective capacitors C1 to C3 connected in parallel, and a lamp current $I_L$ is caused to flow to the discharge lamp L; that, at time t2, the switches SW1 to SW3 are turned onto the other contact B side, the switches SW4 and SW5 are turned OFF to have the respective capacitors C1 to C3 connected in series, and a boosted voltage is applied to the discharge lamp L to cause the lamp current $I_L$ to flow through the lamp L in a direction reverse to that in the above; and that, at time t3, the same operation as that attained at the time t1 starts repeated. With such repetition, the same effect as the foregoing embodiments can be realized.

EXAMPLE 6

Figure 13:
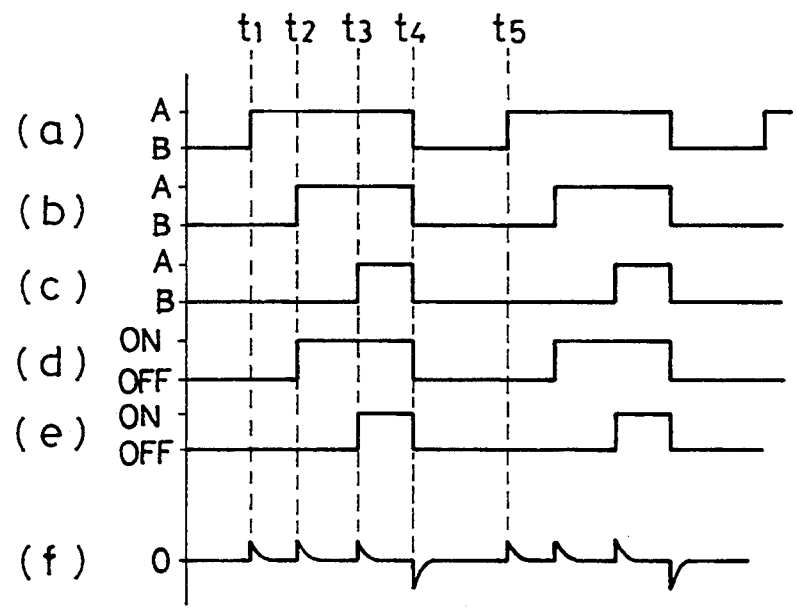
FIG. 13 shows in waveform diagrams the operation in a sixth embodiment of the apparatus according to the present invention.

A sixth embodiment, shown by waveform diagrams (a) to (f) in FIG. 13, of the apparatus for operating discharge lamps is also useful when applied to the instance where the operating voltage of the discharge lamp is higher than the source voltage, and, for the circuit arrangement itself, the same arrangement as in the fifth embodiment is employed in the present embodiment. For the operation in the present embodiment, the switch SW1 is turned onto the contact A side at time t1 as shown in (a) to cause such lamp current $I_L$ as shown in (f) to flow through the discharge lamp L, the switch SW2 is turned onto the contact A side at time t2 as shown in (b) while the switch SW4 is turned ON as shown in (d) to cause the lamp current $I_L$ to flow through the lamp L as shown in (f), and the switch SW3 is turned onto the contact A side at time t3 as shown in (c) while the switch SW5 is turned ON as shown in (e) so as to cause the lmap current $I_L$ to flow through the lamp L as shown in (f). At time t4, next, the switches SW1 to SW3 are all turned onto the other contact B side while the switches SW4 and SW5 are turned ON, and then the lamp current $I_L$ in reverse direction is caused to flow through the lamp L. At time t5, the same state as that at the time t1 is attained again, and the operation is repeated to cause an AC current to flow through the discharge lamp L, whereby the same effect as in the foregoing embodiments can be realized also in the present sixth embodiment.

EXAMPLE 7

Figure 14:
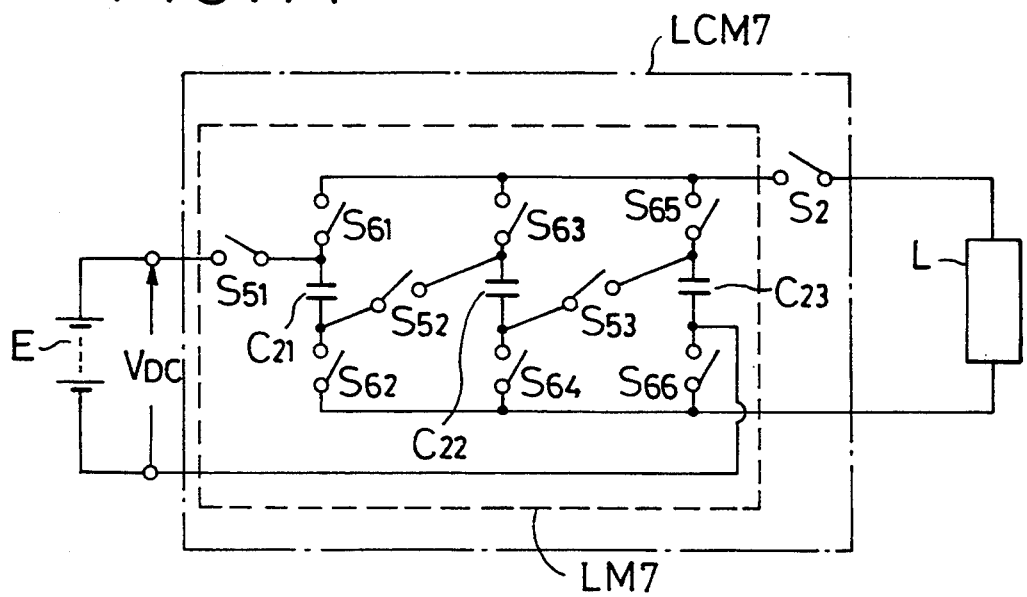
FIG. 14 shows in a circuit diagram a seventh embodiment of the apparatus according to the present invention.

A seventh embodiment as shown in FIG. 14 of the apparatus for operating discharge lamps is useful when applied to the instance where the operating apparatus of the discharge lamp is lower than the source voltage, and the apparatus of this embodiment comprises a operating means LCM7 including means LM7 for lowering the source voltage $V_{DC}$ of the DC power source E. In this operating means LCM7, switches and capacitors constituting the voltage lowering means are made to act also as charging switches and capacitors. Thus, a series circuit of switch S51, capacitor C21, switch S52 interlocked with the switch S51, capacitor C22, switch S53 interlocked with the switch S51 and capacitor C23 is connected to the DC power source E while switches S61 and S62 are connected to both ends of the capacitor C21 in series relationship thereto, switches S63 and S64 are connected to both ends of the capacitor C22 in series relationship thereto, switches S65 and S66 are connected to both ends of the capacitor C23, and these series connected switches are connected through a discharging switch S2 to the discharge lamp L in parallel relationship thereto. These switches S61 to S66 are arranged for an operation as interlocked with each other.

Figure 15:
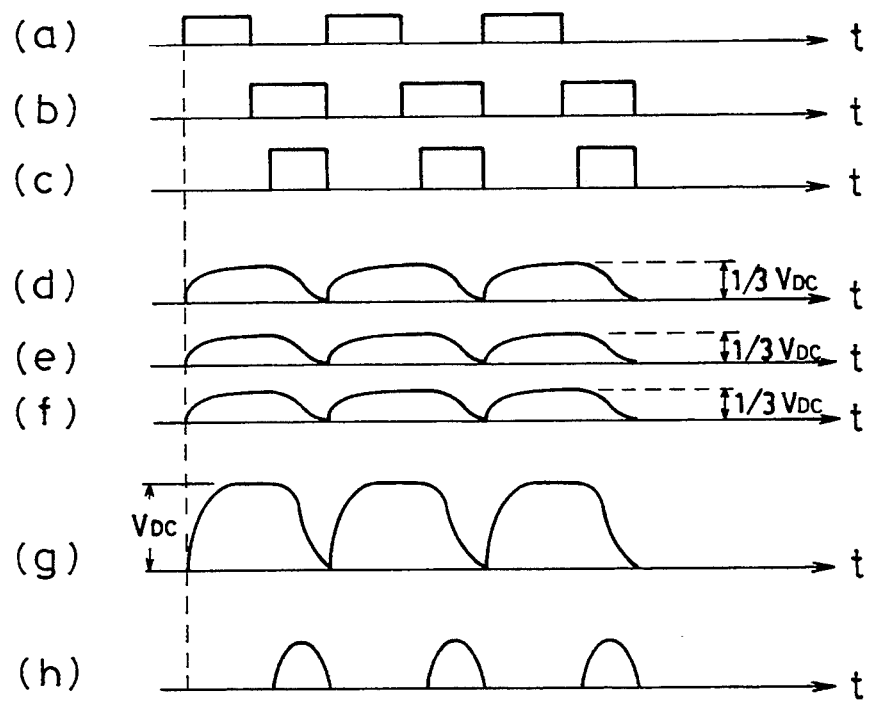
FIG. 15 shows in waveform diagrams the operation at significant positions in the circuit of FIG. 14.

The operation of the seventh embodiment shall be explained with reference also to waveform diagrams (a) to (h) in FIG. 15. As the switches S51 to S53 are turned ON as in (a), the capacitors C21 to C23 are charged respectively with a voltage equally one third of the source voltage $V_{DC}$ of the DC power source E as shown in (d) to (f) so long as the capacitors are of the same capacity, so that a voltage at both ends of the series circuit including the capacitors C21 to C23, that is, the sum of voltages $V_{C21}$ to $V_{C23}$ of these capacitors will be the source voltage $V_{DC}$ of the DC power source E as shown in (g). Next, as the switches S51 to S53 are turned OFF while the further switches S61 to S66 are turned ON as in (b), a parallel circuit of the capacitors C21 to C23 is placed in a state in which they are connected across output ends of the voltage lowering means LM7. When in this state the discharging switch S2 is turned ON as in (c), the charges stored in the capacitors C21 to C23 are discharged with respect to the discharge lamp L, such lamp current $I_L$ as shown in (h) is caused to flow through the discharge lamp L, and a smooth operating of the lamp L can be attained.

With the present embodiment, as described above, it is possible to operate the discharge lamp L having the operating voltage lower than the source voltage $V_{DC}$ of the DC power source E. In the present embodiment, further, increase in the number n of the capacitors and the number of switches in the voltage lowering means LM7 will allow a voltage $(1/n) V_{DC}$ to be obtained, and the apparatus is useful in operating the discharge lamp operating voltage than the source voltage.

EXAMPLE 8

Figure 16:
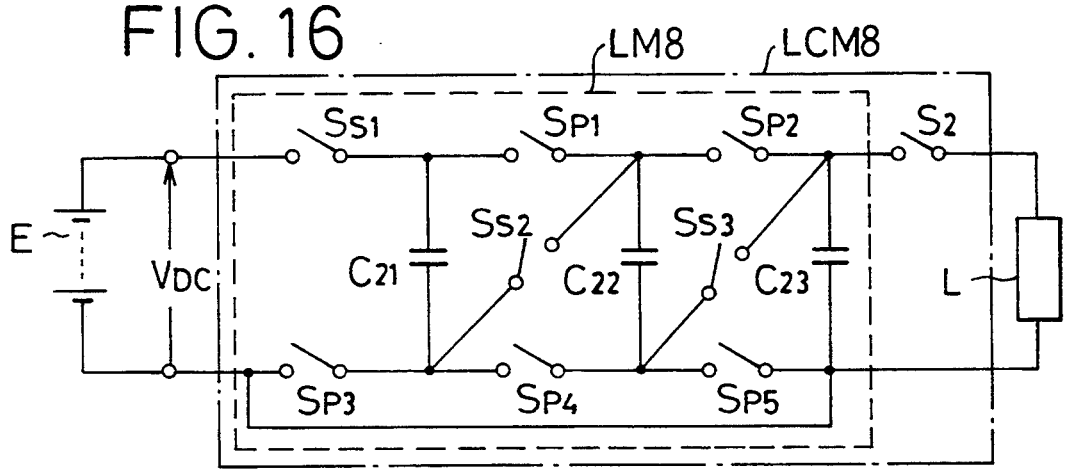
FIG. 16 is a circuit diagram showing an eighth embodiment of the apparatus according to the present invention.
Figure 17A:
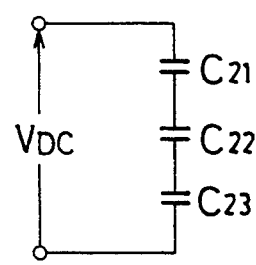
FIGS. 17A and 17B are circuit diagrams equivalent to the circuit of FIG. 16.
Figure 17B:
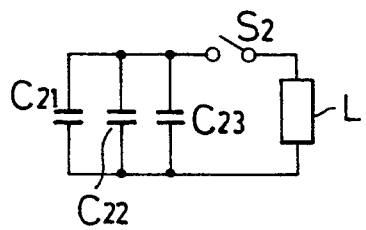

In FIG. 16, there is shown an eighth embodiment of the apparatus for operating discharge lamps which is useful also as applied to the instance where the operating voltage of the discharge lamp is lower than the source voltage, and the apparatus comprises a operating means LCM8 which includes a voltage lowering means LM8. Describing the operation also with reference to FIGS. 17A and 17B, the parallel connection switches $S_{P1}$ to $S_{P5}$ turned OFF, series connection swithes $S_{S1}$ to $S_{S3}$ turned ON and discharging switch S2 turned OFF will cause the capacitors C21 to C23 mutually of the same capacity to be connected in series to the DC power source E as shown in FIG. 17A, and the capacitors are charged until the voltage across this series connection of the capacitors reaches the level of the source voltage $V_{DC}$ of the DC power source E. As the parallel connection switches $S_{P1}$ to $S_{P5}$ are turned ON while the series connection switches $S_{S1}$ to $S_{S3}$ are turned OFF next, the capacitors C21 to C23 are placed into a state of being connected in parallel as shown in FIG. 17B as kept in the charging state, so that they will provide respectively an output voltage of the voltage lowering means LM8 the level of which is $\frac{1}{3}$ of the source voltage $V_{DC}$ of the DC power source E. Thereafter, the discharging switch S2 is turned ON, then the charges from the parallel connection of the three capacitors C21 to C23 are discharged with respect to the discharge lamp L, and the smooth operating of the lamp L can be attained.

In the foregoing arrangement, further, increase in the number of the parallel and series connection switches and capacitors will allow a further voltage lowering can be attained while decrease in such number enables a reduction in voltage lowering ratio. It will be also possible to arrange these elements so that their connection number will vary between the lamp starting operation and constant operation.

EXAMPLE 9

Figure 18:
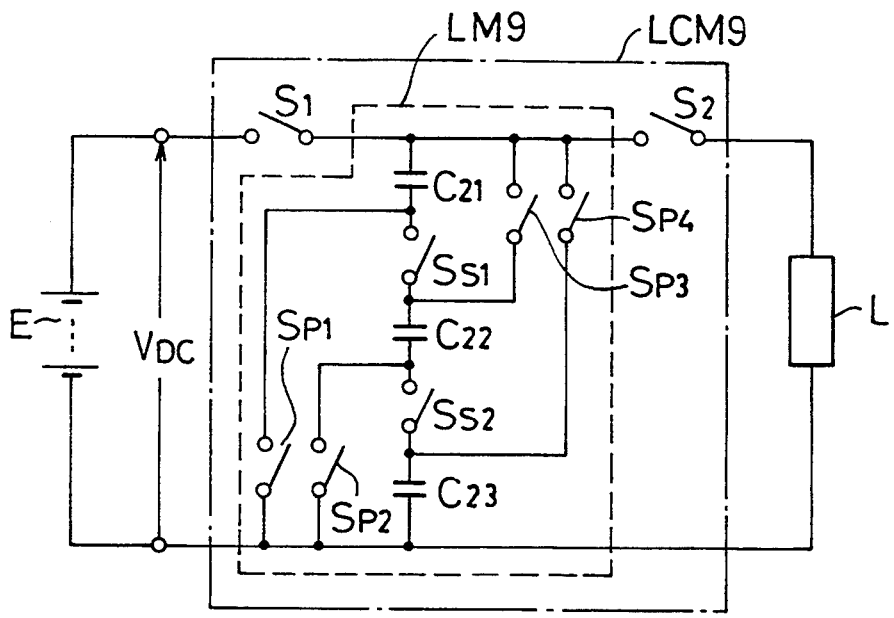
FIGS. 18 to 20 show in circuit diagrams ninth, tenth and eleventh embodiments of the apparatus according to the present invention.

A ninth embodiment of the apparatus for operating discharge lamps is shown in FIG. 18, which is also useful as applied to the instance where the operating voltage of the discharge lamp is lower than the source voltage, and the apparatus comprises a operating means LCM9 including a voltage lowering means LM9. In this embodiment, the arrangement is so made that, as the charging switch S1 and series connection switches $S_{S1}$ and $S_{S2}$ in the voltage lowering means LM9 are turned ON while the parallel connection switches $S_{P1}$ to $S_{P4}$ are turned OFF, a current is caused to flow from the DC power source E through a circuit of the charging switch S1, capacitor C21, switch $S_{S1}$, capacitor C22, switch $S_{S2}$ and capacitor C23, and the capacitors C21 to C23 are thereby charged. That is, these capacitors C21 to C23 are to be charged up to a level of $\frac{1}{3}$ of the source voltage $V_{DC}$ of the DC power source E. As the series connection switches $S_{S1}$ and $S_{S2}$ and charging switch S1 are turned OFF while the parallel connection switches $S_{P1}$ to $S_{P4}$ are turned ON and the discharging switch S2 is turned ON, next, a voltage which is $\frac{1}{3}$ of the source voltage $V_{DC}$ is applied from the voltage lowering means LM9 to the discharge lamp L, and the lamp can be smoothly operated.

Also in this ninth embodiment, the number of the series connection and parallel connection switches and of the capacitors may be properly increased or decreased so that an optimum voltage can be applied to the discharge lamp L.

EXAMPLE 10

Figure 19:
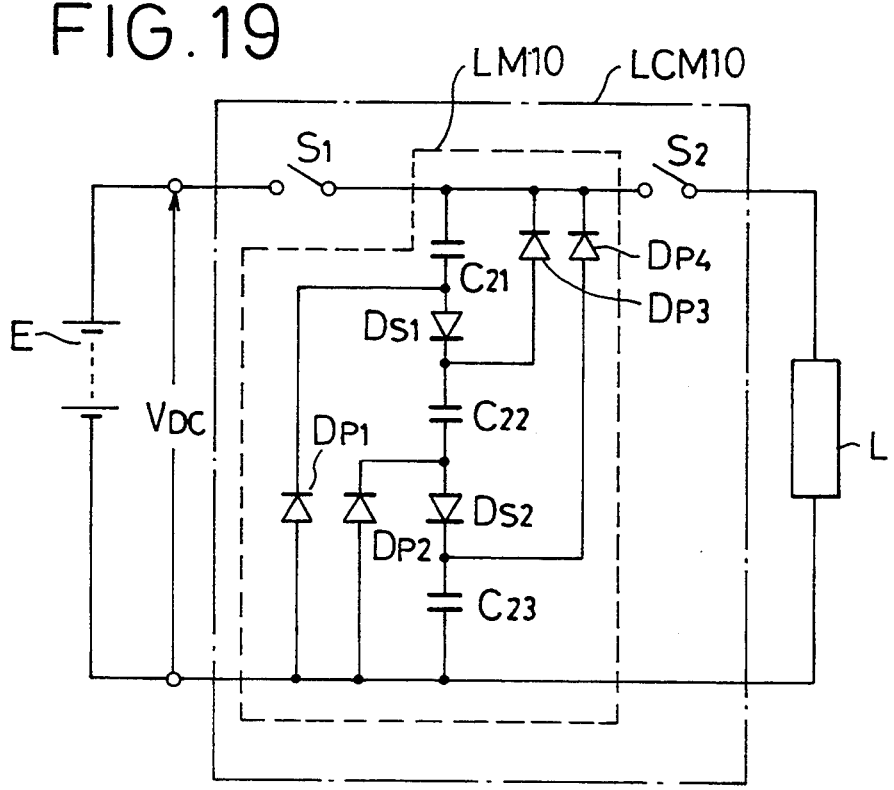

In FIG. 19, a tenth embodiment of the apparatus for operating discharge lamps is shown, which is also useful as employed in the instance where the discharge lamp operating voltage is lower than the source voltage, and the apparatus comprises a operating means LCM10 including a voltage lowering means LM10. In the present embodiment, the voltage lowering means LM10 employs diodes $D_{S1}$ and $D_{S2}$ in place of the series connection switches $S_{S1}$ and $S_{S2}$ used in the voltage lowering means LM10 in the embodiment of FIG. 18, and diodes $D_{P1}$ to $D_{P4}$ in place of the parallel connection switches $S_{P1}$ to $S_{P4}$ also in the means LM10, so that the three capacitors C21 to C23 are made to be charged as connected in the series connection to the DC power source E and thereafter to discharge their charges to the discharge lamp L mutually in the parallel connection, and the lamp L can be smoothly operated.

Also in the present embodiment, the number of the series connection and parallel connection diodes and of the capacitors may properly be increased or decreased for the application of optimum voltage to the discharge lamp L. In this tenth embodiment in particular, it is made possible to render the apparatus to be economical by employing inexpensive diodes.

EXAMPLE 11

Figure 20:
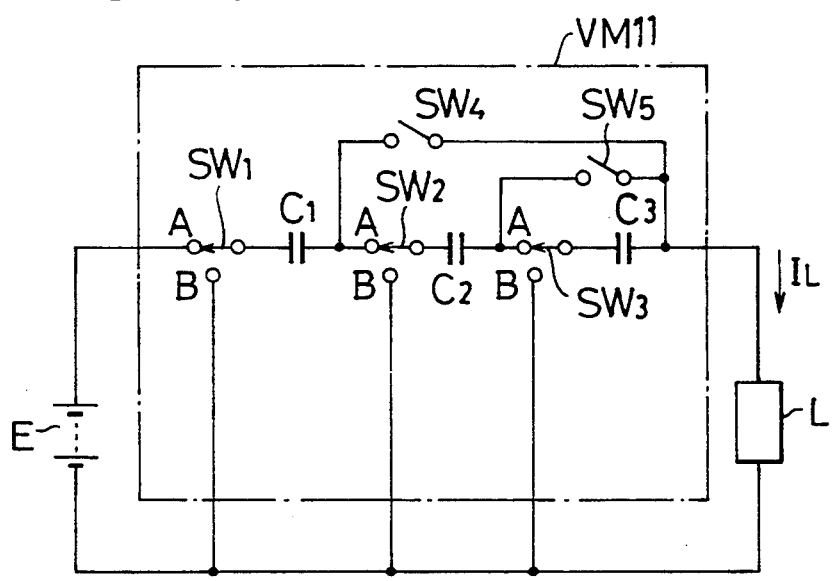
Figure 21:
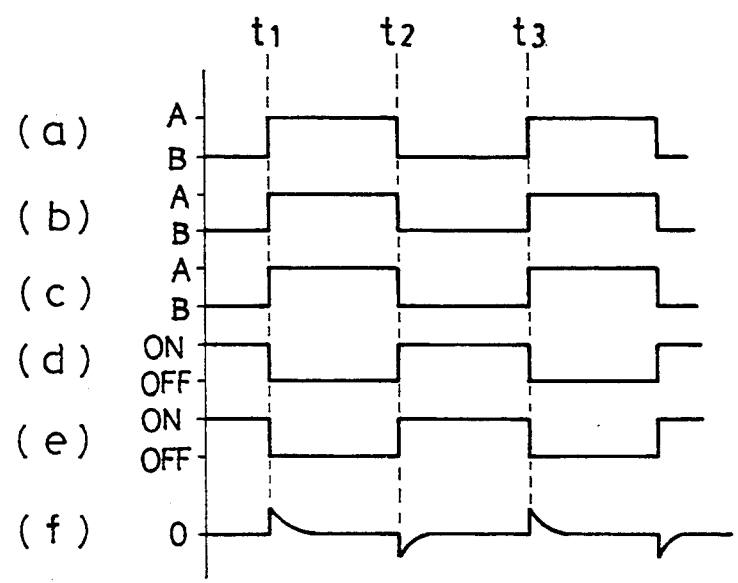
FIG. 21 shows in waveform diagram the operation at significant portions in the circuit of FIG. 20.

An eleventh embodiment of the apparatus for operating discharge lamps as shown in FIG. 20 is also useful as applied to the instance where the discharge lamp operating voltage is lower than the source voltage, and the apparatus comprises a voltage converting means VM11. Describing the operation thereof by referring also to waveform diagrams (a) through (f) in FIG. 21, the switches SW1 to SW3 are turned onto the contact A side as in (a) to (c) while the switches SW4 and SW5 are turned OFF as in (d) and (e) at time t1, then the source voltage $V_{DC}$ of the DC power source E is caused to be applied through the switches SW1 to SW3 to a series circuit of the capacitor Co (of a series composite capacity of the capacitor C1 to C3) and the discharge lamp L, and such lamp current $I_L$ as in (f) is made to flow through the discharge lamp L. At time t2 next, the switches SW1 to SW3 are turned onto the other contact B side while the switches SW4 and SW5 are turned ON, then the capacitors C1 to C3 are placed into the parallel connection to have their charges discharged to the discharge lamp L so that a lowered voltage will be applied to the lamp, and the lamp current $I_L$ in a direction reverse to that in the above will be caused to flow to the lamp L. At time t3, next, the same state as that attained at the time t1 is reached again and, with repetition of such operation, the discharge lamp L can be subjected to the AC operating.

In the present embodiment, too, the number of the switches and capacitors may be properly increased or decreased, so as to modify the arrangement for optimum voltage application to the discharge lamp.

EXAMPLE 12

Figure 22:
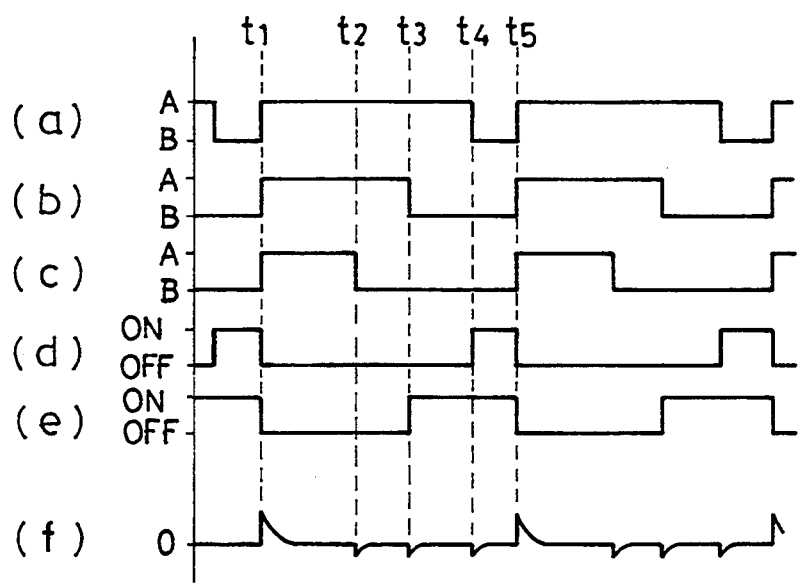
FIG. 22 shows in waveform diagrams the operation of a twelfth embodiment of the apparatus according to the present invention.

A twelfth embodiment of the apparatus for operating discharge lamps as shown by waveform diagrams (a) to (f) in FIG. 22 is also useful as applied to the instance where the discharge lamp operating voltage is lower than the source voltage, and the present embodiment employs a circuit arrangement which itself is the same as that in the foregoing eleventh embodiment of Example 11. In the present embodiment, the operation is so made that, at time t1, the switches SW1 to SW3 are turned onto the contact A side as in (a) to (c) while the switches SW4 and SW5 are turned OFF as in (d) and (e) so that the lamp current $I_L$ is caused to flow through a series circuit of the capacitors C1 to C3 to the discharge lamp L; at time t2, the switch SW3 is turned onto the other contact B side to cause the lamp current $I_L$ to flow to the lamp in a direction reverse to that in the above; at time t3, the switch SW2 is turned onto the other contact B side to have the switch SW5 turned ON; at time t4, the switch SW1 is turned onto the contact B side to turn the switch SW4 ON for supplying such lamp current $I_L$ as in (f) to the discharge lamp L; and, at time t5, further, the same state as attained at the time t1 is reached again. With repetition of such operation, the AC operating of the discharge lamp L can be smoothly attained.

Also in the present embodiment, the arrangement allows the number of the switches and capacitors to be properly increased or decreased for the optimum voltage application to the discharge lamp.

EXAMPLE 13

Figure 23:
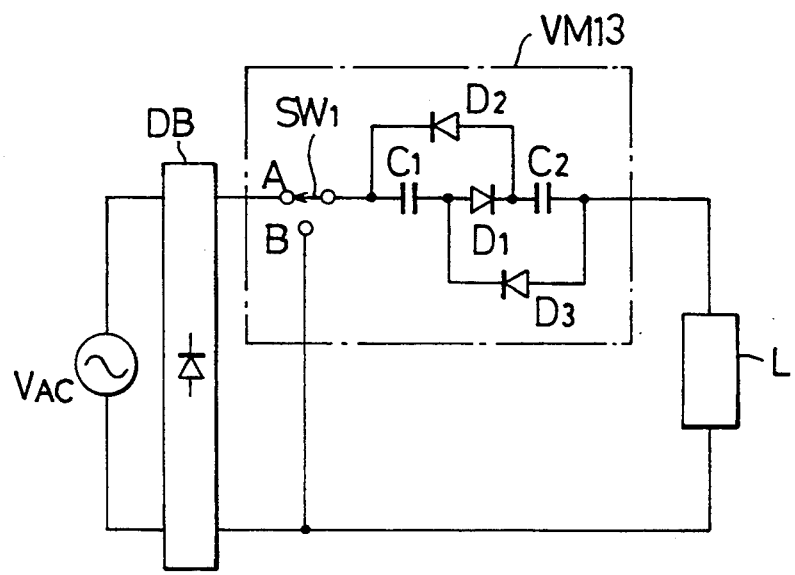
FIGS. 23 to 25 are circuit diagrams showing thirteenth, fourteenth and fifteenth embodiments of the apparatus according to the present invention.

The apparatus for operating discharge lamps in a thirteenth embodiment of FIG. 23 is also useful in applying to the instance in which the discharge lamp operating voltage is lower than the source voltage, and this apparatus comprises a voltage conversion means VM13. In the present embodiment, the voltage conversion means VM13 is formed by a combination of three diodes D1 to D3 and two capacitors C1 and C2, and a supplied power from an AC power source $V_{AC}$ is subjected preferably to a full-wave rectification by means of a diode bridge DB for being supplied to the voltage conversion means VM13. In the operation, the diodes D2 and D3 are made OFF while the switch SW1 is on the contact A side, and the capacitors C1 and C2 are charged in their series connection. When the switch SW1 is on the other contact B side, the diode D1 is turned OFF, the capacitors C1 and C2 are placed into their state of parallel connection to have a lowered voltage applied from these capacitors to the discharge lamp L, and an AC operating of the lamp can be smoothly attained.

Also in this thirteenth embodiment, the arrangement allows the number of the switches, diodes and capacitors to be properly increased or decreased for the optimum voltage application to the discharge lamp.

EXAMPLE 14

Figure 24:
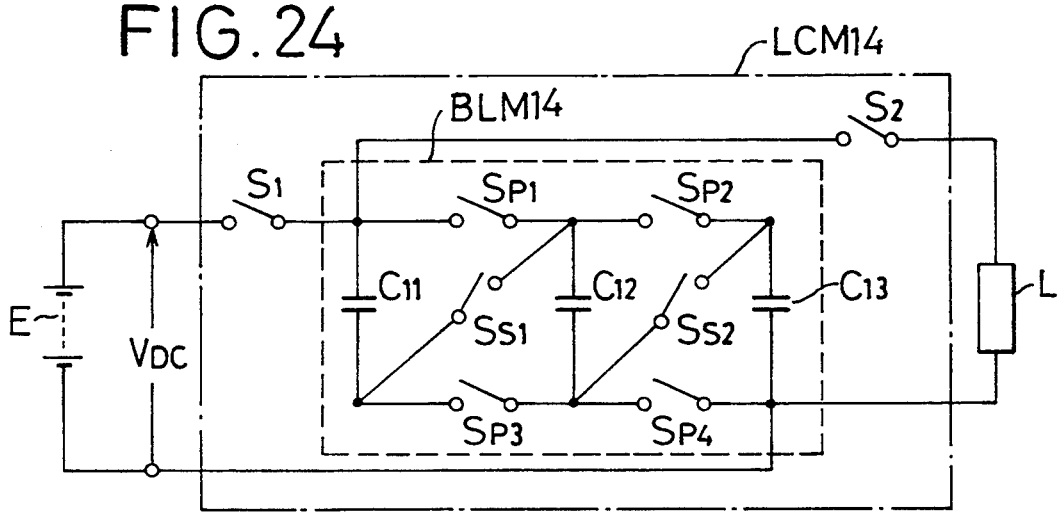

The apparatus for operating discharge lamps in a fourteenth embodiment as shown in FIG. 24 is useful when applied to an instance where the discharge lamp operating voltage varies to be higher and lower than the source voltage, and the apparatus of this embodiment comprises a operating means LCM14 including a voltage boosting and lowering means BLM14 the operation of which can be changed over between the voltage boosting and the voltage lowering. More specifically, the charging switch S1 is initially turned ON, the parallel connection switches $S_{P1}$ to $S_{P4}$ are made ON while the series connection switches $S_{S1}$ and $S_{S2}$ as well as the discharging switch S2 are turned OFF, whereby the three capacitors C11 to C13 are placed into the parallel connection with respect to the DC power source E to be charged respectively to a level of the source voltage $V_{DC}$ of the DC power source E. Next, the charging switch S1 as well as the parallel connection switches $S_{P1}$ to $S_{P4}$ are turned OFF while the series connection switches $S_{S1}$ and $S_{S2}$ and discharging switch S2 are turned ON, then the three capacitors C11 to C13 are placed into the series connection state so as to supply a voltage three times as high as the source voltage $V_{DC}$ of the DC power source E to the discharge lamp L for its smooth operating, and the voltage boosting and lowering means BLM14 is thus made to function as the boosting means.

When on the other hand the charging switch S1 and series connection switches $S_{S1}$ and $S_{S2}$ are turned ON whereas the parallel connection switches $S_{P1}$ to $S_{P4}$ and discharging switch S2 are turned OFF, the capacitors C11 to C13 are put into the series connected state and are respectively charged. Then, as the charging switch S1 and series connection switches $S_{S1}$ and $S_{S2}$ are turned OFF while the parallel connection switches $S_{P1}$ to $S_{P4}$ and discharging switch S2 are turned ON, a voltage of $\frac{1}{3}$ of the source voltage $V_{DC}$ of the DC power source E is applied to the discharge lamp L for its smooth operating, and the voltage boosting and lowering means BLM14 is thus made to function as the voltage lowering means.

As will be clear from the foregoing, this fourteenth embodiment can provide an apparatus for operating discharge lamps capable of properly dealing with two types of the discharge lamps, one being for use with a high voltage and the other being for use with a lower voltage, with the respective switches subjected to a selective operation, and the embodiment is advantageous in the adaptability to a wide range of the operating voltage. In the present embodiment, the number of the switches and capacitors are properly increased or decreased so that the apparatus for operating discharge lamps can be further improved in the adaptability to the operating voltage of the discharge lamp.

EXAMPLE 15

Figure 25:
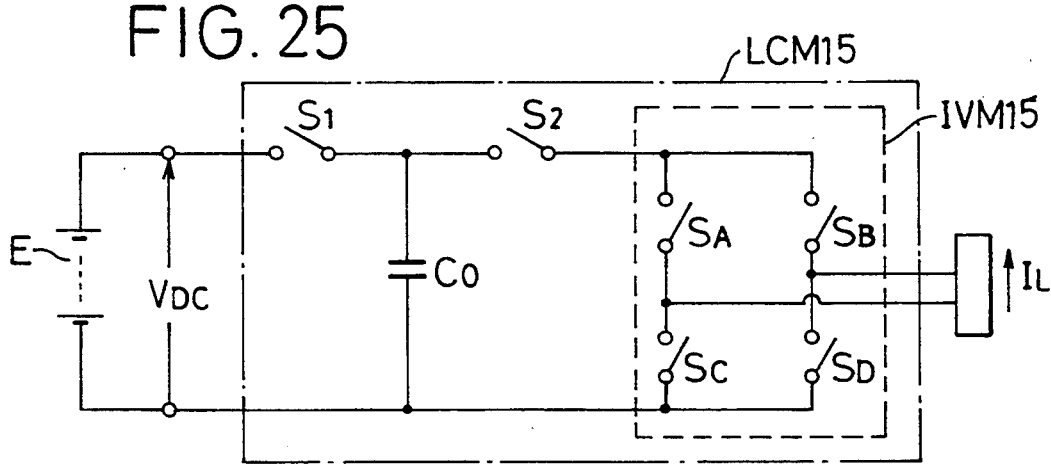
Figure 26:
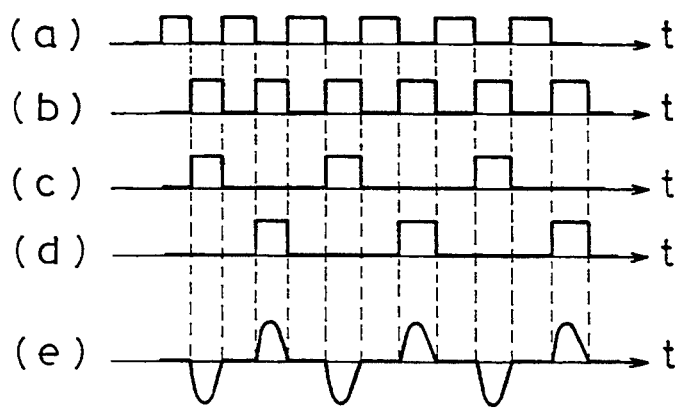
FIGS. 26 and 27 show in waveform diagrams the operation at main parts in the circuit of FIG. 25, respectively.

The apparatus for operating discharge lamps in a fifteenth embodiment shown in FIG. 25 comprises a operating means LCM15 including a polarity inverting means IVM15 capable of inverting the polarity of the supplied power to the discharge lamp L. The polarity inverting means IVM15 includes a bridge connection of switches $S_A$ to $S_D$, in which the switches $S_A$ to $S_D$ are so arranged that two switches $S_A$ and $S_D$ or $S_B$ and $S_C$ are turned ON and OFF simultaneously and two pairs of the switches $S_A$, $S_D$ and $S_B$, $S_C$ are alternately turned ON and OFF through a control means (not shown here). Describing the operation with reference also to waveform diagrams (a) to (e) of FIG. 26, the charging switch S1 is first turned ON as in (a) to have the capacitor Co charged, and thereafter the charging switch SW1 is turned OFF. Next, the discharging switch SW2 is turned ON as in (b) and, simultaneously therewith or as slightly delayed therefrom, the switches $S_A$ and $S_D$ in the polarity inverting means IVM15 are turned ON as in (c), and then the charge in the capacitor Co is made to flow through the discharging switch S2, switch $S_A$, discharge lamp L, switch $S_D$ and back to the capacitor Co. As this discharge terminates, the discharging switch S2, switch $S_A$ and switch $S_D$ are turned OFF, and such lamp current $I_L$ as shown in (e) is caused to flow through the discharge lamp L in a direction upward in the drawing.

Next, the charging switch S1 is again turned ON to charge the capacitor Co, thereafter the charging switch S1 is turned OFF while the discharging switch S2 is turned ON and, simultaneously therewith or as slightly delayed therefrom, the switches $S_B$ and $S_C$ are turned ON as in (d), then the charge in the capacitor Co is caused to flow through the discharging switch S2, switch $S_B$, discharge lamp L, switch $S_C$ and back to the capacitor Co, and the lamp current $I_L$ is caused to flow through the lamp in a direction reverse to the above, to be downward in the drawing. Accordingly, repetition of the above operation allows the discharge lamp L to be smoothly AC operation.

Figure 27:
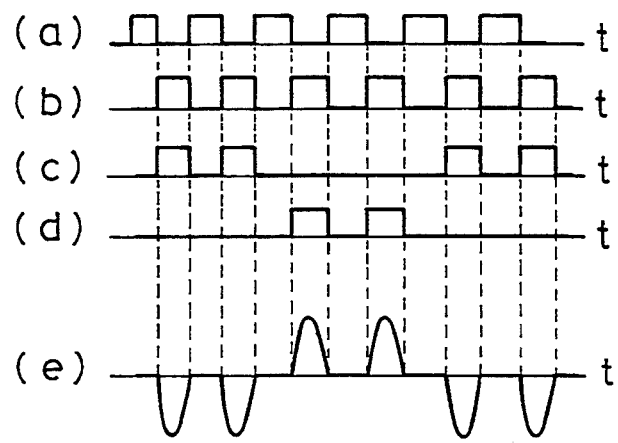

Referring also to waveform diagrams (a) to (e) of FIG. 27, the operation may be so made that the switches $S_A$ and $S_D$ are sequentially turned ON and OFF as shown by (c) with respect to the charge and discharge made twice of the capacitor Co by means of the charging and discharging switches S1 and S2 as in (a) and (b) and, next, the switches $S_B$ and $S_C$ are sequentially turned ON and OFF as in (d) with respect to the charge and discharge made twice of the capacitor Co by means of the charging and discharging switches S1 and S2, then the lamp current $I_L$ is caused to be reversed in the polarity at every two pulses as shown in (e). This reversing cycle may of course not be every two pulses but may be of any optional number of the charging and discharging, so that the polarity may be reversed after the lamp current supply for any desired number of repetition in the same polarity, and the envelope of the lamp current $I_L$ may be converted so that the frequency of the lamp current $I_L$ will be lowered to be $\frac{1}{2}$ or 1/n.

EXAMPLE 16

Figure 28:
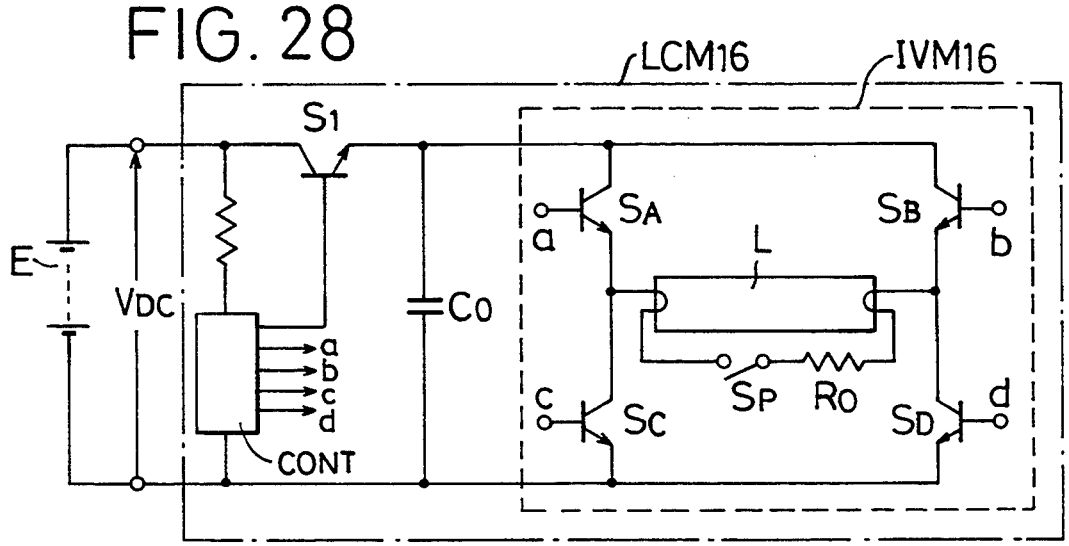
FIG. 28 shows in a circuit diagram a sixteenth embodiment of the apparatus according to the present invention.
Figure 29:
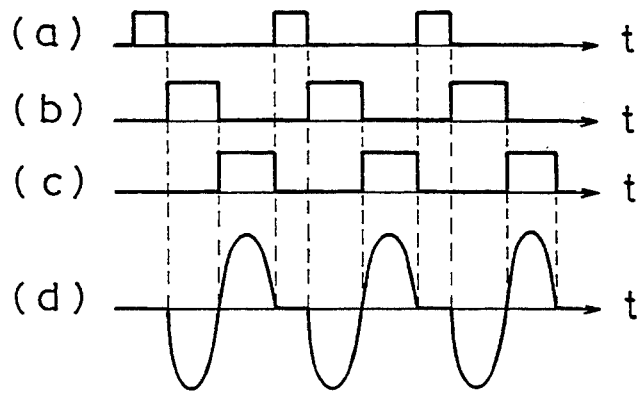
FIG. 29 shows in waveform diagrams the operation at main parts in the circuit of FIG. 28.

In a sixteenth embodiment of the apparatus for operating discharge lamps shown in FIG. 28, there is also included an operating means LCM16 having such polarity inverting means IVM16 that can invert the polarity of the supplied power to the discharge lamp L. the polarity inverting means IVM16 comprises transistor switches $S_A$ to $S_D$ in the bridge connection so that the function of the discharging switch can be realized by these switches $S_A$ to $S_D$, and a proper control means (not shown here) so controls the charging switch S1 and switches $S_A$ to $S_D$. Referring here to the operation of the apparatus in this embodiment of FIG. 28 in conjunction with waveform diagrams (a) to (d) of FIG. 29, the charging switch S1 is turned ON and OFF as in (a) so that the charge in the capacitor Co stored upon each ON operation of the charging switch S1 causes each set of the switches $S_A$ and $S_D$ and the switches $S_B$ and $S_C$ to be turned ON and OFF once as in (b) and (c), whereby the charge is made to be discharged to the discharge lamp L as in (d) in both of the positive and negative polarities and the discharge lamp L can be smoothly AC operation.

The apparatus in the present embodiment is arranged preferably such that, upon starting the discharge lamp L, a switch $S_p$, connected across terminals, which are not connected to the switches, of filaments f1 and f2 of the discharge lamp L through a resistor Ro, is turned ON and OFF for a short period to flow a preheating current to the filaments f1 and f2.

EXAMPLE 17

Figure 30:
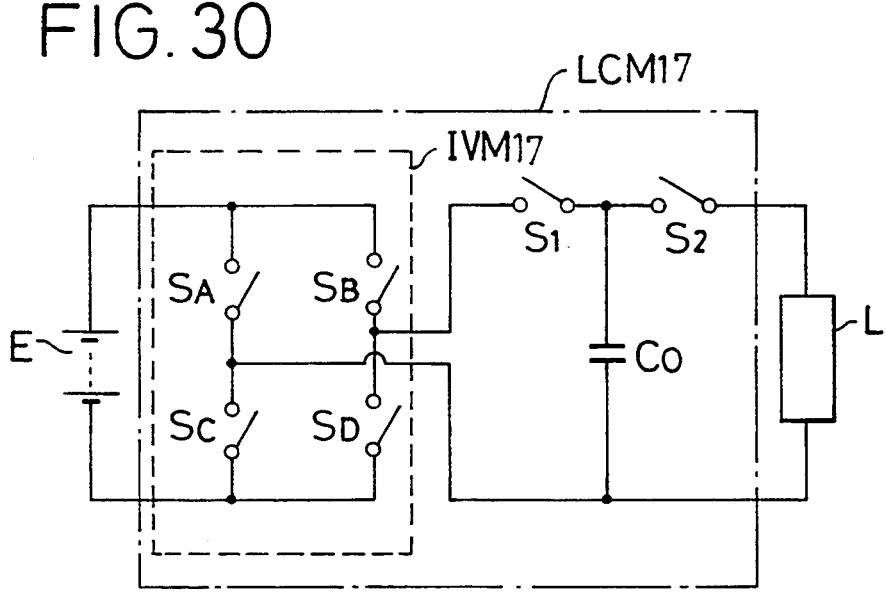
FIGS. 30 and 31 are circuit diagrams showing seventeenth and eighteenth embodiments of the apparatus according to the present invention.

The apparatus for operating discharge lamps in an seventeenth embodiment shown in FIG. 30 also comprises the operating means LCM17 including the polarity inverting means IVM17 capable of inverting the polarity of the supplied power to the discharge lamp L. In the present embodiment, in particular, the capacitor Co employed is of a bilateral type which repeats the charging and discharging in response to an AC type operation. Further, the present embodiment may be so arranged as to have the function of the charging switch S1 achieved by the switches $S_A$ to $S_D$. Other functions of this embodiments are substantially the same as those described with reference to the sixteenth embodiment shown in FIG. 25.

EXAMPLE 18

Figure 31:
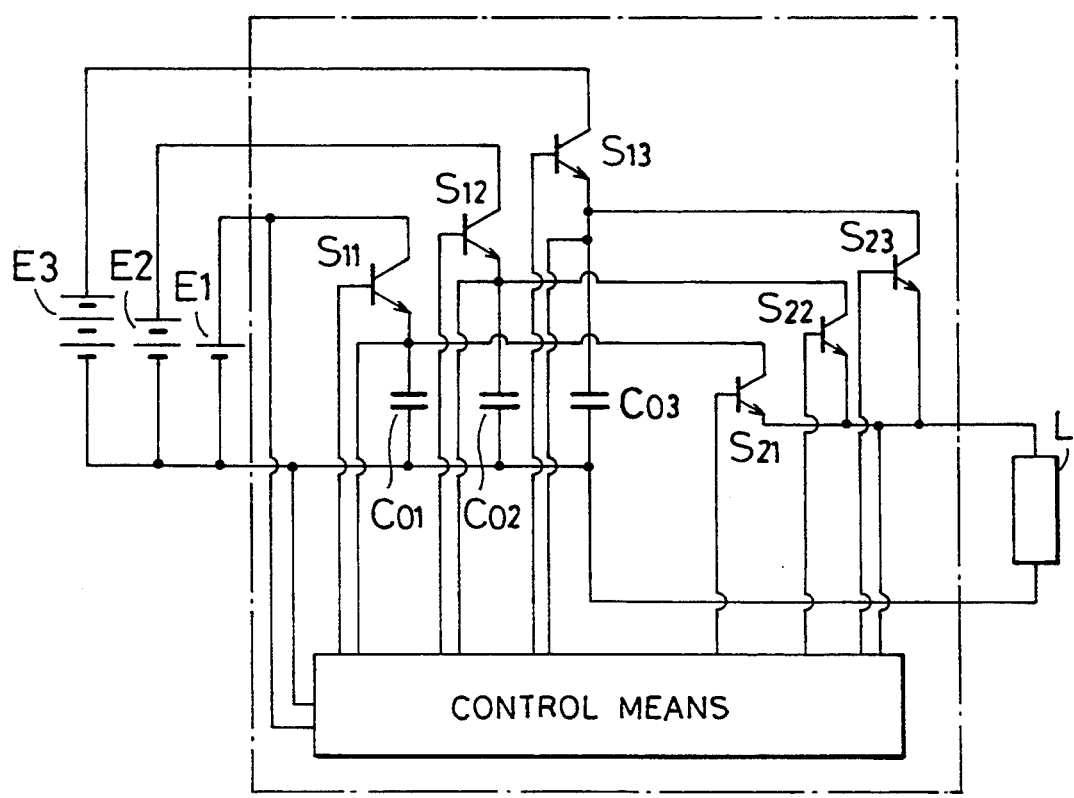

The apparatus for operating discharge lamps in an eighteenth embodiment shown in FIG. 31 comprises a operating means LCM18 of an arrangement adapted for use with a plurality of power sources. That is, there are employed in this eighteenth embodiment three voltages $V_{DC1}$ to $V_{DC3}$ of three different DC power sources E1 to E3. Provided here that capacitors $C_{01}$ to $C_{03}$ are of the same capacity and the voltages of the DC power sources E1 to E3 are of a relationship $V_{DC1} < V_{DC2} < V_{DC3}$, then the lamp current $I_L$ is made to be the smallest by a combined operation of the charging and discharging switches S11 and S21, to be about the medium by a combined operation of the charging and discharging switches S12 and S22, and to be the largest by a combined operation of the charging and discharging switches S13 and S23, and the apparatus allows the lamp current $I_L$ to be properly increased and decreased by changing over such operational combination, without changing the frequency.

Figure 32:
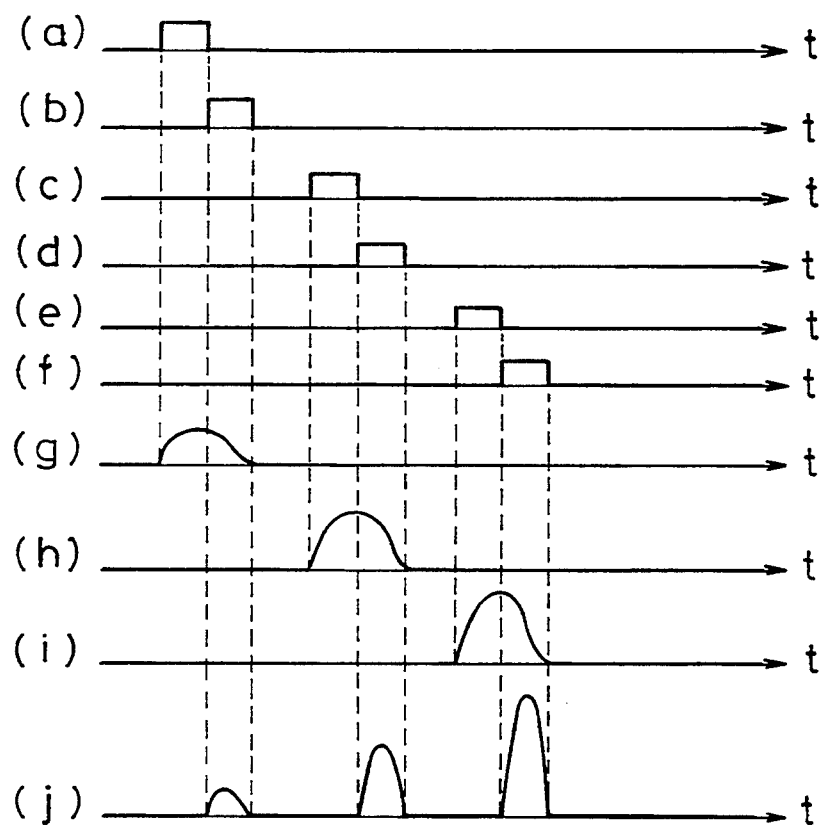
FIGS. 32 and 33 show in waveform diagrams the operation at main parts in the circuit of FIG. 31.

Referring here also to waveform diagrams (a) through (j) of FIG. 32, (a) shows the ON operation of the charging switch S11 while (b) denotes the ON operation of the discharging switch S21, (g) represents a change in the voltage $V_{C01}$ of the capacitor $C_{01}$ due to the charge and discharge, and the lamp current $I_L$ made to flow to the discharge lamp L in ON state of the discharging switch S21 is so small as shown in (j). Further, (c) represents the ON operation of the charging switch S12 while (d) denotes the ON operation of the discharging switch S22, (h) shows a change in the voltage $V_{C02}$ of the capacitor $C_{02}$ due to the charge and discharge, and the lamp current $I_L$ made to flow through the discharge lamp L in ON state of the switch S22 will be about the medium as shown by (j). For an arrangement adapted for obtaining the different DC voltages $V_{DC}$ from the single DC power source E, it will be possible to employ such boosting means as in the foregoing third embodiment or such voltage lowering means as in the foregoing seventh embodiment, so as to obtain such three different voltage sources as in the present embodiment.

Figure 33:
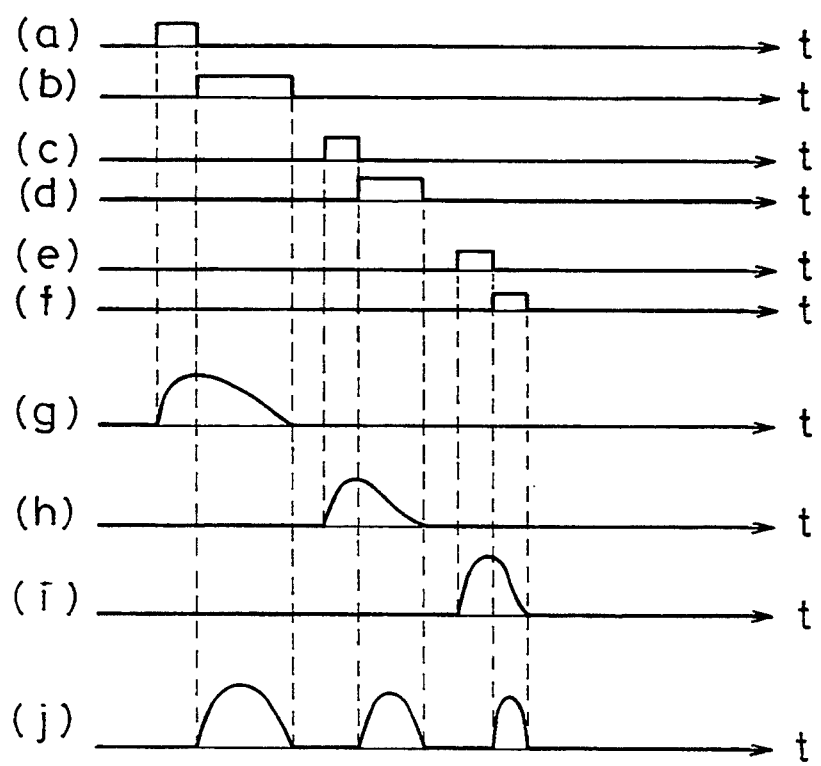

Further, with an arrangement of the operating means LCM18 of FIG. 31 for attaining such a relationship in the capacity as $C_{01} > C_{02} > C_{03}$, it is made possible to increase and decrease the lamp current $I_L$ as desired by means of respective combined operation of the charging switches S11 to S13 with the discharging switches S21 to S23 as shown in waveform diagrams (a) to (j) of FIG. 33 corresponding to (a) to (j) in FIG. 32. In FIG. 33, (e) and (f) represent the ON operation respectively of the charging switch S13 and discharging switch S23 while (i) denotes a change in the voltage $V_{C03}$ of the capacitor $C_{03}$ due to its charge and discharge, upon which the lamp current $I_L$ flowing through the discharge lamp L in the ON state of the discharging switch S23 become so small as shown in (j). In this eighteenth embodiment, further, a proper combination of the frequency allows the lamp current to be controllable over a wide range.

Even with a fixed frequency, an additional provision of an arrangement rendering the frequency variable also allows the wide range control of the lamp current $I_L$ to be achieved.

EXAMPLE 19

Figure 34:
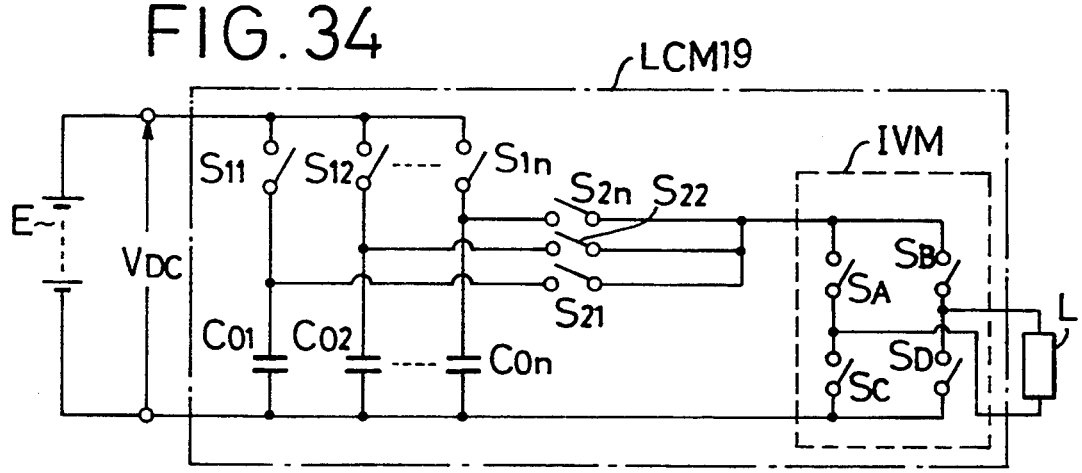
FIG. 34 is a circuit diagram of a nineteenth embodiment of the apparatus according to the present invention.

The apparatus for operating discharge lamps in a nineteenth embodiment shown in FIG. 34 comprises the operating means LCM19 including the polarity inverting means IVM19. More specifically, a plurality of series circuits of each of the charging switches S11 to S1n and each of the capacitors $C_{01}$ to $C_{0n}$ are connected in parallel to the DC power source E, an input side of the polarity inverting means IVM19 is connected through each of the discharging switches S21 to S2n to each of the capacitors $C_{01}$ to $C_{0n}$ individually, the charging switches S11 to S1n, discharging switches S21 to S2n and bridge-connected switches $S_A$ to $S_D$ are respectively thereby controlled, and the discharge lamp L is to be AC operation.

Figure 35:
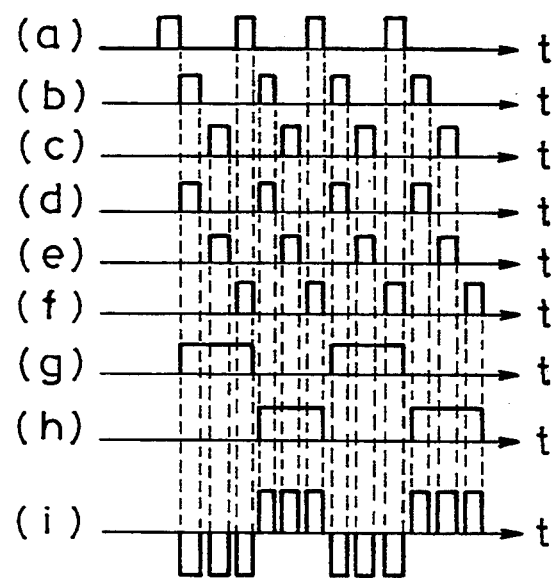
FIGS. 35 and 36 show in waveform diagrams the operation at main parts in the circuit of FIG. 34.

Referring to an example of the control in the present nineteenth embodiment of FIG. 34 in conjunction with waveform diagrams (a) to (i) of FIG. 35, with an assumption of n=3, the charging switch S11 to S1n are cyclically turned ON and OFF as shown in (a) to (c), the discharging switches S21 to S2n are turned ON and OFF in synchronism with the turning ON and OFF of the charging switches S11 to S1n as in (d) to (f), and two sets of the switches $S_A$, $S_D$ and $S_B$, $S_C$ in the polarity inverting means IVM19 are alternately turned ON and OFF at every one cycle of the turning ON and OFF of the discharging switch S21 as shown in (g) and (h). In this way, the charges in the capacitors $C_{01}$ to $C_{0n}$ are sequentially discharged to the lamp L, and, as in (i), the lamp current $I_L$ is made to flow to the lamp L in a direction in accordance with the turning ON and OFF of the set of the switches $S_A$ and $S_D$ and the set of the switches $S_B$ and $S_C$ in the polarity inverting means IVM19. This control represented in FIG. 35 is found to be optimum in an event where the frequency of the envelope for the lamp current flowing through the discharge lamp L is desired to be lowered.

Figure 36:
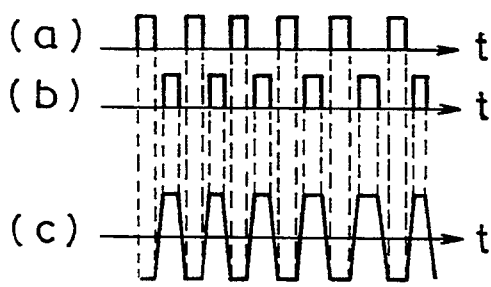

When on the other hand the lamp current $I_L$ of a high frequency is intended to be supplied to the discharge lamp L, the switch set $S_A$ and $S_D$ and the other switch set $S_B$ and $S_C$ in the polarity inverting means IVM19 are alternately turned ON and OFF as in waveform diagrams (a) and (b) of FIG. 36 in correspondence to the turning ON and OFF of one of the discharging switches S21 to S2n, and the lamp current $I_L$ can be made high in the frequency as in (c) of FIG. 36.

With the employment of the above polarity inverting means IVM19, further, it is possible to prevent the light emission from being biased, that is, a cataphoresis phenomenon occurring in a low temperature atmosphere due to that ions inside the discharge lamp L are concentrated onto one side. It is also possible to prevent the electrodes of the lamp from being unduly worn out due to collisions of ions only with one directional electrode of the discharge lamp L, so that the endwise blackening of the discharge lamp can be restrained to have the life of the lamp elongated. Further, it is possible to employ capacitors for use with the AC source power as the charging and discharging capacitors $C_{01}$ to $C_{0n}$, so that the capacitors can be prolonged in the life and any high frequency loss can be reduced. When the switches $S_A$ to $S_D$ in the polarity inverting means IVM19 are arranged to be interlocked with the charging or discharging switches, further, the control can be executed extremely precisely, the lamp current $I_L$ for the discharge lamp L can be properly increased or decreased in the frequency, and any noise problem can be effectively eliminated by avoiding any frequency generally employed in electronic machines and apparatus.

EXAMPLE 20

Figure 37:
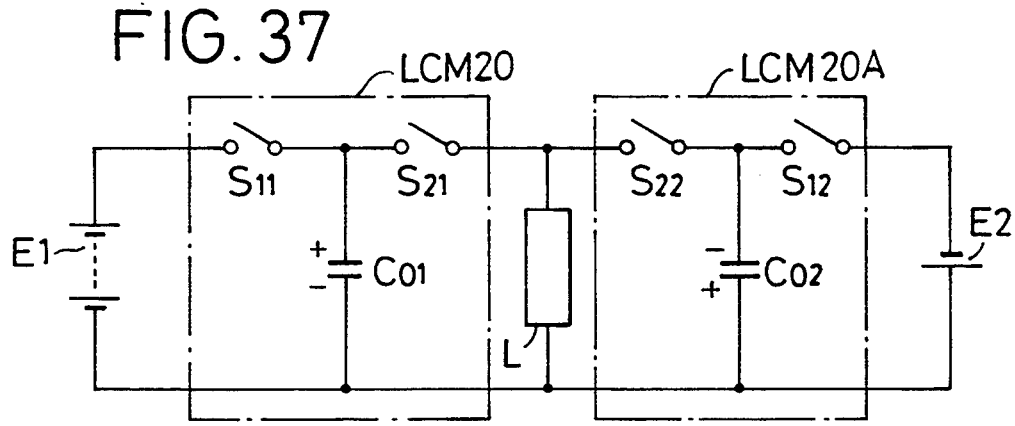
FIGS. 37 to 40 show in circuit diagrams twentieth to twenty-third embodiments of the apparatus according to the present invention.

In a twentieth embodiment of the apparatus for operating discharge lamps as shown in FIG. 37, there are employed two sets of the DC power sources E1 and E2 and the operating means LCM20 and LCM20A, with the latter two of which the direction of the lamp current is changed over for the operating of the discharge lamp L. In this case, the discharging switches S21 and S22 are arranged so as not to be turned ON simultaneously.

EXAMPLE 21

Figure 38:
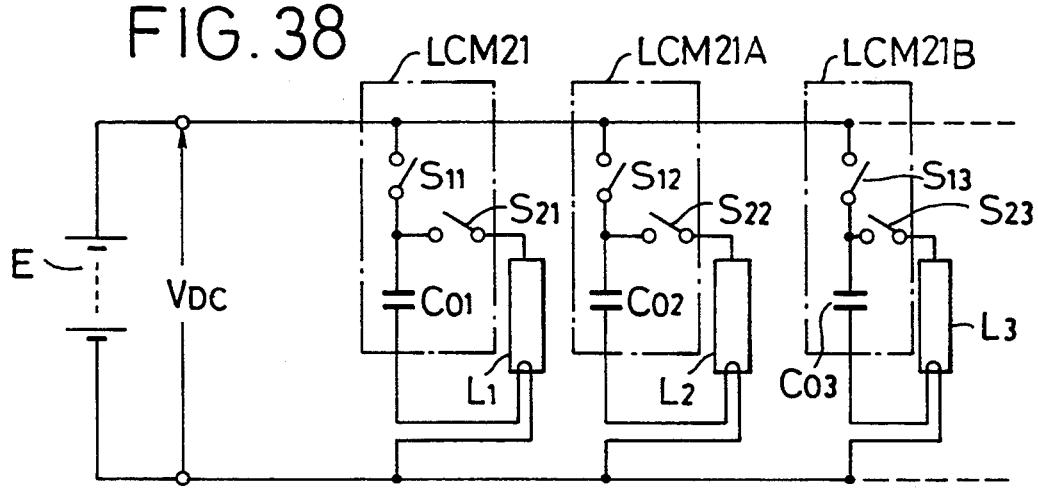

A twenty-first embodiment of the apparatus for operating discharge lamps as shown in FIG. 38 is designed for use in operating three discharge lamps, for which purpose three sets of the operating means LCM21, LCM21A and LCM21B for preheating the filaments with charging current for the capacitor are connected to the DC power source E. These operating means LCM21, LCM21A and LCM21B for the discharge lamps L1, L2 and L3 operate in a manner corresponding to that in the foregoing embodiment. Further, while the present embodiment is designed for operating three discharge lamps, an apparatus for use with any desired number of the discharge lamps can be provided by connecting a desired number of the operating means.

EXAMPLE 22

Figure 39:
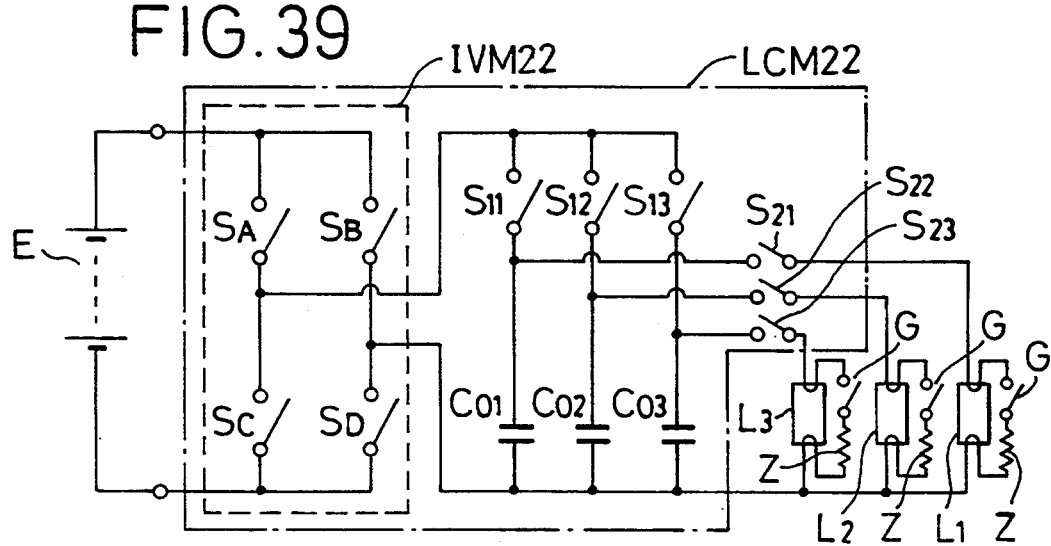

A twenty-second embodiment shown in FIG. 39 of the apparatus for operating discharge lamps is provided with a required number of the operating means for three discharge lamps, together with one polarity inverting means IVM22 for common use by the respective operating means. In this apparatus, the number of the charging switches S11 to S13, discharging switches S21 to S23, capacitors $C_{01}$ to $C_{03}$ and discharge lamps L1 to L3 may be increased for easy increase in the number of the discharge lamps, and the lamps can be subjected to the AC supply.

EXAMPLE 23

Figure 40:
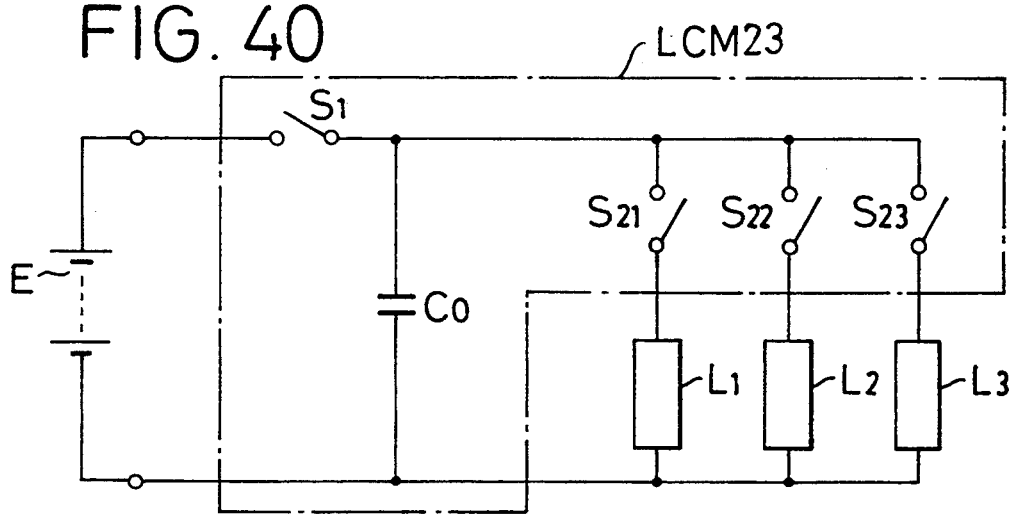
Figure 41:
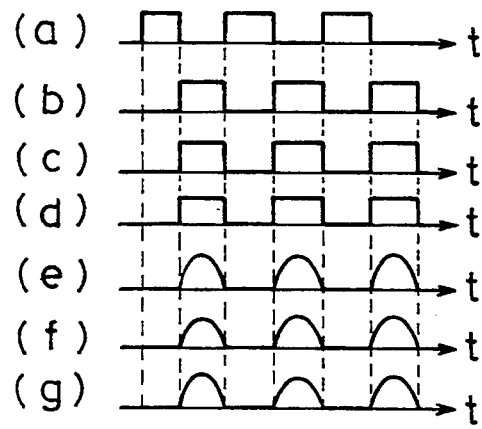
FIGS. 41 and 42 show in waveform diagrams different operating states at main parts in the circuit of FIG. 40.
Figure 42:
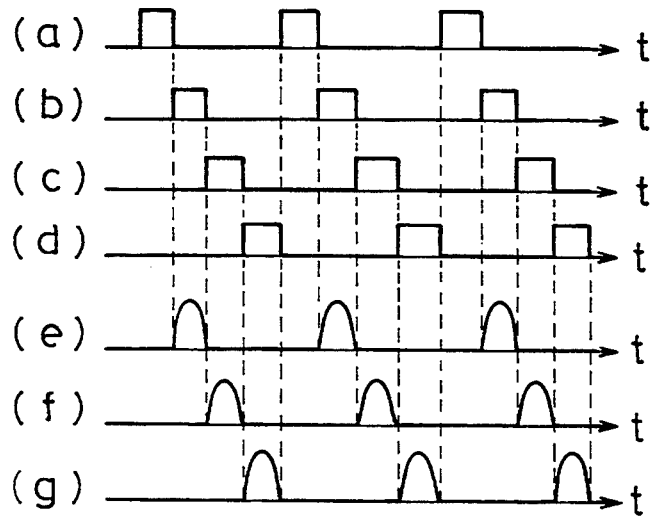

In a twenty-third embodiment shown in FIG. 40, the apparatus for operating discharge lamps employs an operating means LCM23 in which the arrangement is made for lighting a plurality of the discharge lamps L1 to L3 with a single capacitor Co, with a plurality of the discharging switches S21 to S23 employed so that the discharge lamps L1 to L3 are connected in parallel to the capacitor Co respectively through each of the discharging switches S21 to S23. Referring to the operation of this embodiment of FIG. 40 in conjunction with waveform diagrams (a) to (g) of FIG. 41, the charging switch S1 and discharging switches S21 to S23 are alternately turned ON and OFF as shown in (a) to (d), and the lamp currents $I_{L1}$ to $I_{L3}$ are supplied simultaneously to the discharge lamps L1 to L3 as in (e) to (g) to have them operated. Further in conjunction with waveform diagrams (a) to (g) in FIG. 42, the cycle of the ON operation of the charging switch S1 is subjected to a time division as in (a) of FIG. 42, the discharging switches S21 to S23 are sequentially turned ON and OFF as in (b) to (d), and the lamp currents $I_{L1}$ to $I_{L3}$ are supplied sequentially to the respective discharge lamps L1 to L3 as in (e) to (g) to have them operated. In this case, the respective discharge lamps L1 to L3 as viewed as a whole are executing the light emission sequentially, so that the emission can be made with a less flickering while the flicker can be made hardly recognizable by increasing flickering frequency.

EXAMPLE 24

Figure 43:
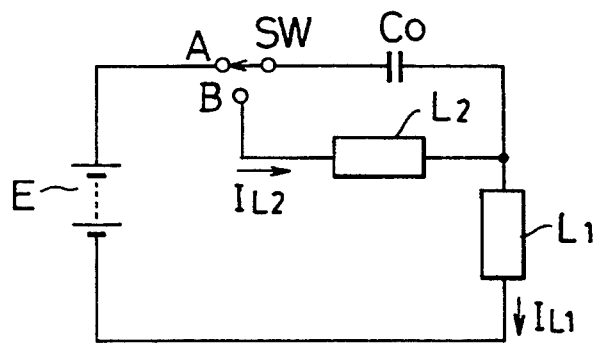
FIG. 43 is a circuit diagram of twenty-fourth embodiment of the apparatus according to the present invention.
Figure 44:
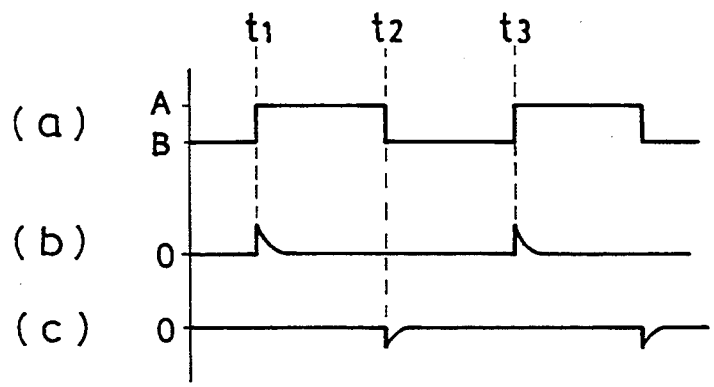
FIG. 44 shows in waveform diagrams the operation at main portions in the circuit of FIG. 43.

The apparatus for operating discharge lamps in a twenty-fourth embodiment shown in FIG. 43 is constituted for operating two discharge lamps L1 and L2, in which the discharge lamp L2 is connected between a contact B side of switch SW and a junction point of the capacitor Co to the discharge lamp L1. Referring to the operation of this embodiment of FIG. 43 in conjunction with waveform diagrams (a) to (c) of FIG. 44, the switch SW turned onto the other contact A side at time t1 as in (a) causes such lamp current $I_{L1}$ as in (b) to be supplied from the DC power source E through the capacitor Co to the discharge lamp L1, whereas the switch SW turned onto the contact B side at time t2 causes the charge in the capacitor Co to be discharged to the discharge lamp L2 to cause such lamp current $I_{L2}$ as in (c) to be supplied to the lamp L2. At time t3, next, the switch SW is turned again onto the contact A side to have the above operation repeated, and the lamp currents $I_{L1}$ and $I_{L2}$ are thus made to flow through the discharge lamps L1 and L2. The arrangement may be also so made that the capacitor Co and switch SW are provided in a plurality in the same manner as the capacitor and switch in the foregoing fifth embodiment. Further, the power source may not be limited to the DC power source but the AC power source may be similarly employed.

EXAMPLE 25

Figure 45:
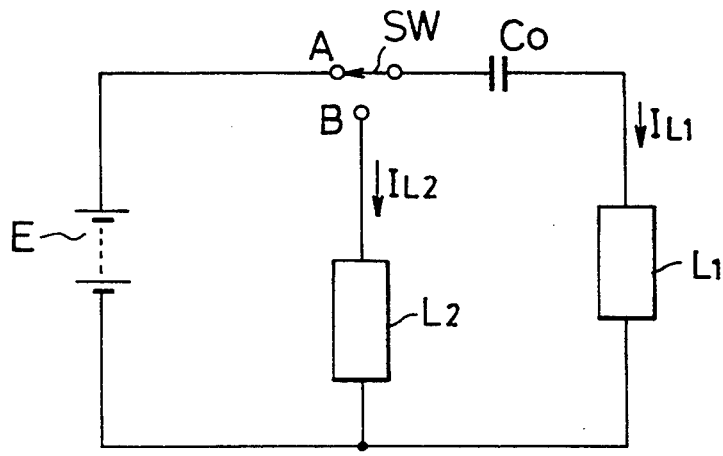
FIG. 45 is a circuit diagram showing twenty-fifth embodiment of the apparatus according to the present invention.
Figure 46:
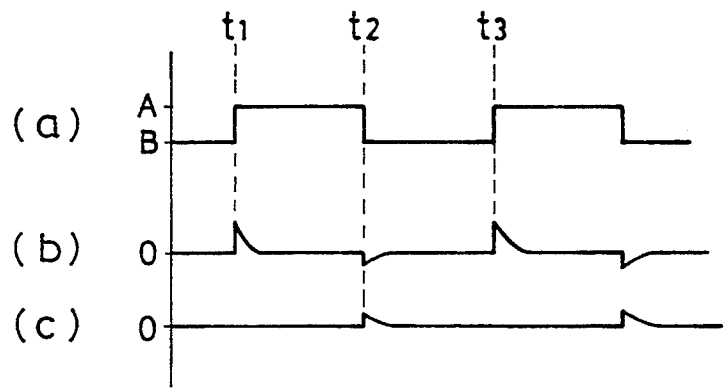
FIG. 46 shows in waveform diagrams the operation at main portions in the circuit of FIG. 45.

In the apparatus for operating discharge lamps of a twenty-fifth embodiment as shown in FIG. 45, the second discharge lamp L2 is connected between a junction point of the first discharge lamp L1 to the DC power source E and the contact B side of the switch SW. Referring to the operation of this embodiment of FIG. 45 in conjunction with waveform diagrams (a) to (c) of FIG. 46, the switch SW turned onto the contact A side at time t1 as in (a) of FIG. 46 causes such lamp current $I_{L1}$ as in (b) to flow through the capacitor Co to the discharge lamp L1. At time t2, next, the switch SW is turned onto the contact B side, then the charge stored in the capacitor Co is discharged through both discharge lamps L1 and L2, upon which the lamp current $I_{L1}$ in a direction reverse to the above flows through the discharge lamp L1 while such lamp current $L_{L2}$ as in (c) flows through the discharge lamp L2, and both discharge lamps L1 and L2 are smoothly operated, the lamp L1 being subjected to an AC-operation here.

In the above, the arrangement of the capacitor Co and switch SW may be modified to the one in which a plurality of the capacitors and switches are employed as in the foregoing fifth embodiment. Further, instead of the DC power source, it is possible to employ the AC power source.

EXAMPLE 26

Figure 47:
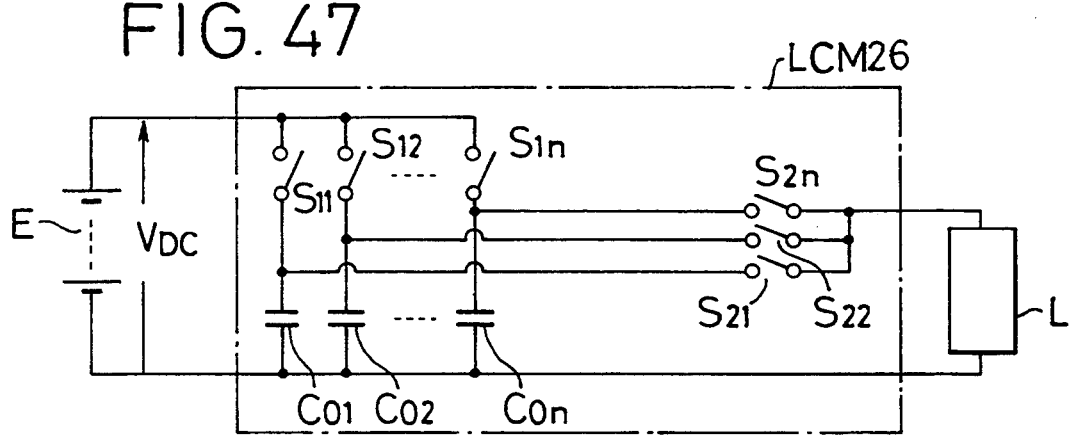
FIG. 47 is a circuit diagram of twenty-sixth embodiment of the apparatus according to the present invention.
Figure 48:
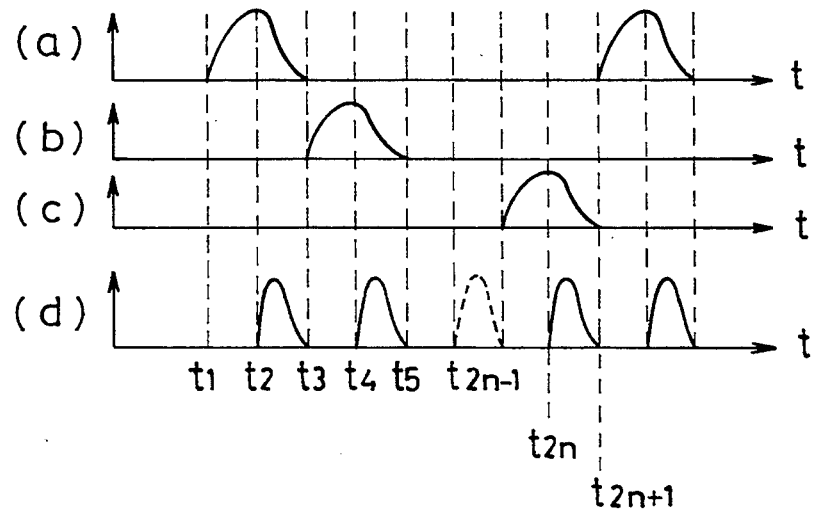
FIGS. 48 and 49 show in waveform diagrams the operation at main portions in the circuit of FIG. 47.

In a twenty-sixth embodiment of the apparatus for operating discharge lamps shown in FIG. 47, the operating means LCM26 is constituted by employing the charging switches S11 to S1n and discharging switches S21 to S2$n$ in correspondence to the capacitors $C_{01}$ to $C_{0n}$. Referring to the operation in conjunction with waveform diagrams (a) to (d) of FIG. 48, the charging switches S11 to S1$n$ are turned ON at time t1, t3, ... t2$n$−1 and are turned OFF at time t2, t4, ... t2$n$, whereas the discharging switches S21 to S2$n$ are turned ON at time t2, t4, ... t2$n$ and are turned OFF at time t1, t3, ... t2$n$+1. With this arrangement, the capacitors $C_{01}$ to $C_{0n}$ will have such voltages $V_{C01}$, $V_{C02}$, ... $V_{C0n}$ as in (a) to (c) of FIG. 48, and the lamp current $I_L$ of the discharge lamp L will be as in (d). This lamp current $I_L$ can be formed into an aspect of fine pulses of small intervals by increasing the number of the capacitor Co, charging switch S1 and discharging switch S2 as has been described.

Figure 49:
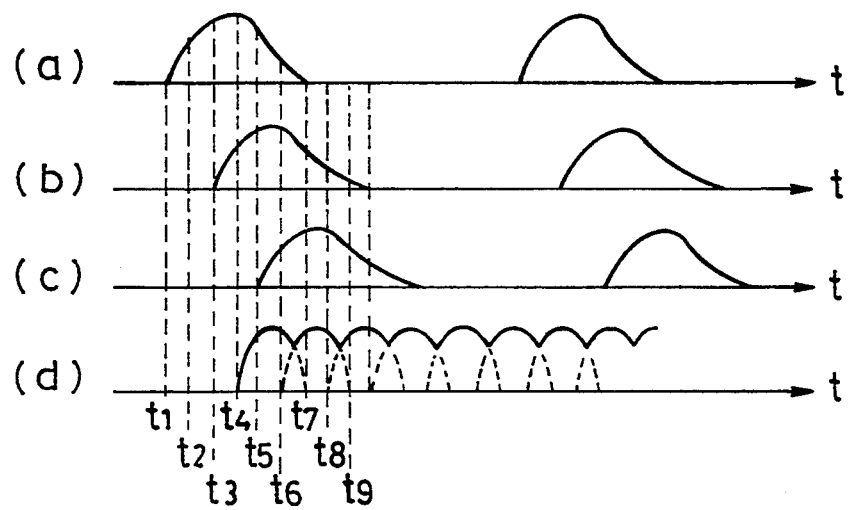

The apparatus in this embodiment may be also operated as shown by such waveforms (a) to (d) as in FIG. 49. That is, the charging switches S11 to S1$n$ and discharging switches S21 to S2$n$ are respectively turned ON and OFF at a timing involving a time lag, so that the discharged currents of the respective capacitors $C_{01}$ to $C_{0n}$, that is, current pulses for the discharge lamp L will slightly partly overlap with one another as shown in (d) and the lamp current $I_L$ will have no zero time. In (a) to discharging voltages $V_{C01}$ to $V_{C0n}$ of the capacitors $C_{01}$, (c) of FIG. 49, there are shown the charging and $C_{02}$ and $C_{0n}$. Since the lamp current $I_L$ becomes never zero once the discharge lamp L is operated, it is made unnecessary to apply any high voltage as a reigniting voltage of the lamp, and the voltage $V_{DC}$ of the DC power source E may be of a value effectively lowered. Further, when the overlapping of the discharge currents of the capacitors $C_{01}$ to $C_{0n}$ is made to be of a larger extent, the lamp current $I_L$ can be made closer to a direct current, generated flux of light output of the discharge lamp L can be thereby made to be of less flickering, and an excellent illumination can be realized.

EXAMPLE 27

Figure 50:
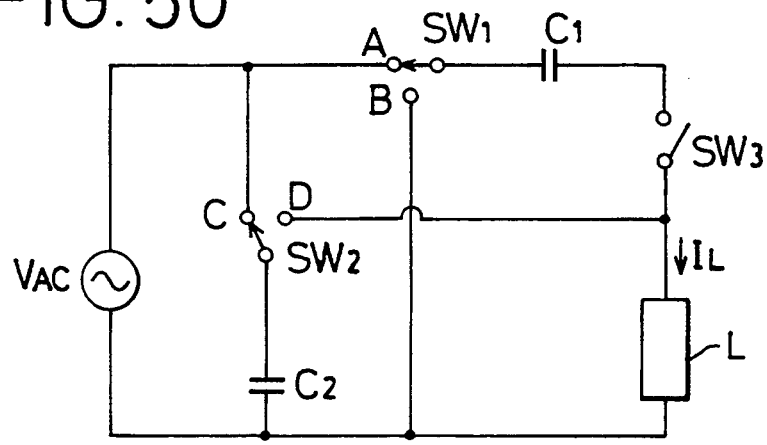
FIG. 50 shows in a circuit diagram twenty-seventh embodiment of the apparatus according to the present invention.
Figure 51:
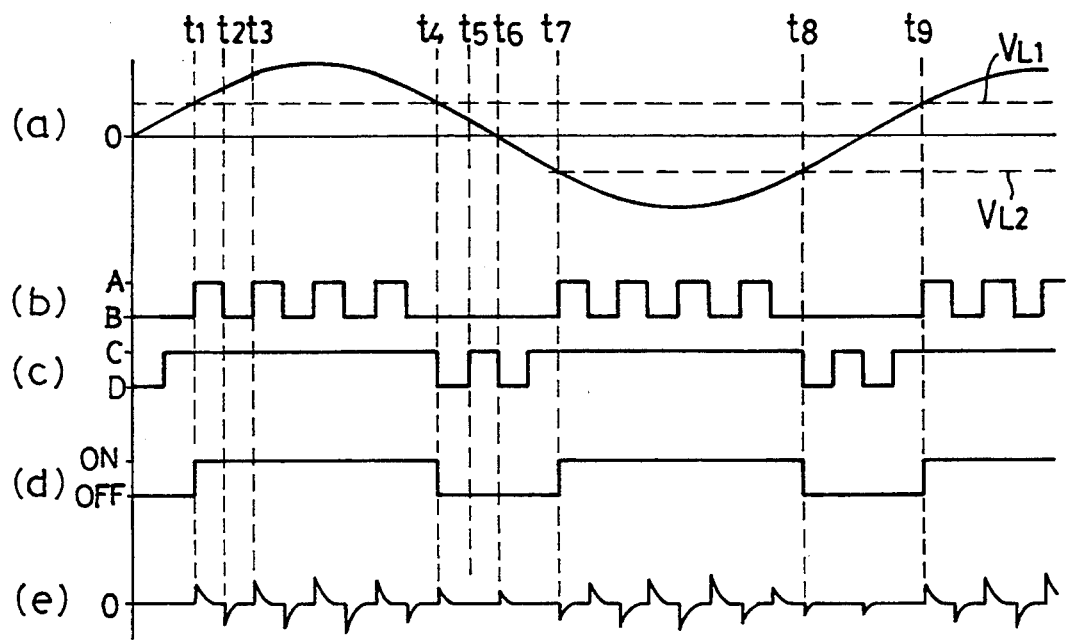
FIG. 51 shows in waveform diagrams the operation at main portions in the circuit of FIG. 50.

In a twenty-seventh embodiment shown in FIG. 50 of the apparatus for operating discharge lamps, there are provided two paths of power supply, in first path of which the discharge lamp L is connected through the contact A side of the switch SW1, capacitor C1 and switch SW3 to an AC power source $V_{AC}$ and in second path of which the discharge lamp L is subjected to the power supply with a parallel connection to the lamp of a further capacitor C2 turned onto its contact D side from its contact C side on which the capacitor C2 has been charged. Referring to the operation in conjunction with waveforms (a) to (e) of FIG. 51, a voltage is predetermined and the first path including the switch SW1 and capacitor C1 is employed under a voltage above the predetermined voltage, while the second path including the switch SW2 and capacitor C2 is used under a voltage below the predetermined voltage. Assuming that levels of the predetermined voltage in both polarities of the AC power are $V_{L1}$ and $V_{L2}$, the source voltage $V_{AC}$ of the AC power source exceeds the voltage $V_{L1}$ at time t1, the switch SW1 is thereby turned onto the contact A side as in (b), the switch SW2 is thus turned onto the contact C side as in (c), the switch SW3 is turned ON as in (d), and then such lamp current $I_L$ as in (e) is caused to flow through the capacitor C1 to the discharge lamp L. At time t2, next, the switch SW1 is turned onto the B side, the lamp current $I_L$ in a direction reverse to the above is made to flow to the discharge lamp L.

At time t3, the switch SW1 is turned back to the contact A side, the above operation is thereby repeated for subsequent period, and the discharge lamp L is supplied with an AC power. As the AC source voltage $V_{AC}$ comes below the voltage $V_{L1}$ at time t4, at least the switch SW3 is turned OFF, and the switch SW2 is turned over. If this turning of the switch SW2 is onto the contact D side, the charge in the capacitor C2 is supplied to the discharge lamp L and, with alternate turning of the switch SW2 between both contacts C and D from time t5 to t7, the discharge lamp L is kept being supplied with energy. As the source voltage $V_{AC}$ exceeds the voltage $V_{L2}$ at time t7, next, the switch SW2 is kept not to turn but the switch SW3 is turned ON, and the switch SW1 is made to turn. At time t8, the switch SW2 is turned over and, at time t9, the same state as that at time t1 is reached. With repetition of this operation, the discharge lamp L is subjected to an AC operation. With a use of the boosting means in the foregoing embodiment of FIG. 9 in place of the switch SW2 and capacitor C2, the apparatus is made to be capable of increasing the supplied voltage to the discharge lamp in the period when the source voltage is low.

EXAMPLE 28

Figure 52:
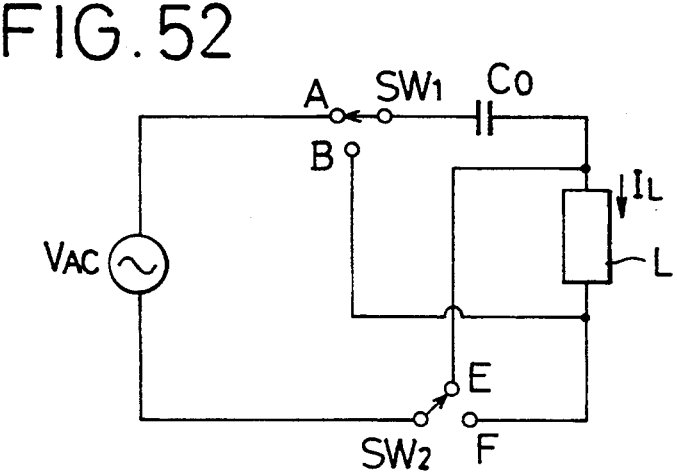
FIG. 52 is a circuit diagram of twenty-eighth embodiment of the apparatus according to the present invention.
Figure 53:
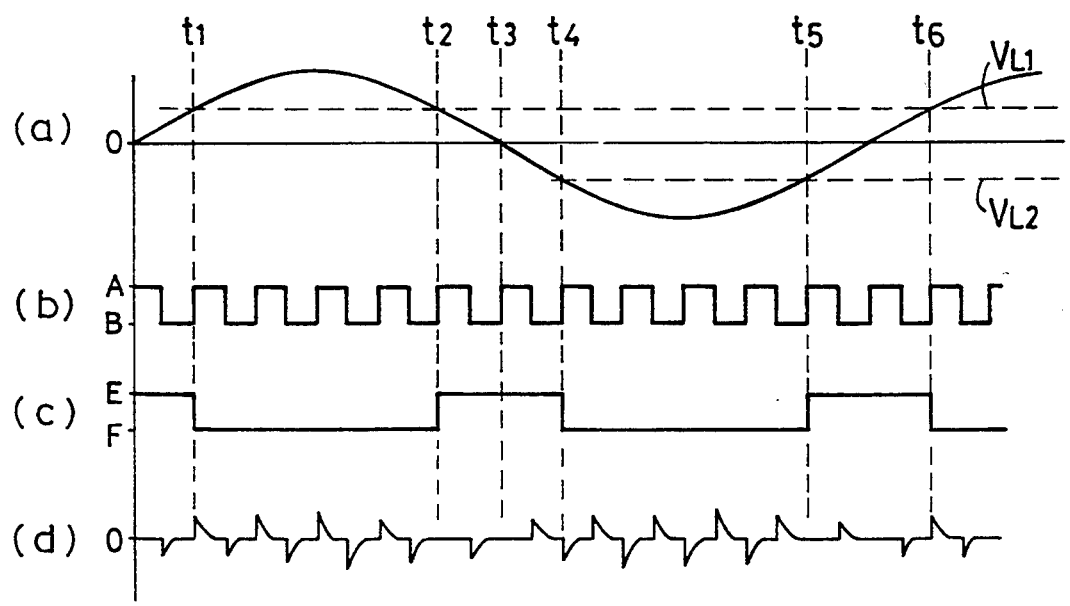
FIG. 53 shows in waveform diagrams the operation at main portions in the circuit of FIG. 52.

In a twenty-eighth embodiment shown in FIG. 52, the apparatus is made to execute the operation of such two capacitors C1 and C2 as in the foregoing twenty-seventh embodiment by means of a single capacitor Co. Referring to the operation in conjunction with waveforms (a) to (d) of FIG. 53, the AC source voltage $V_{AC}$ exceeding the voltage $V_{L1}$ at time t1 as in (a) causes the switch SW2 turned onto its contact F side as in (c), and such alternately turning of the switch SW1 between both contacts A and B as in (b) causes an energy to be supplied through the capacitor Co to the discharge lamp L. At time t2, next, the switch SW is turned onto its contact E side while the switch SW1 is turned onto the contact A side, a charge is thereby stored in the capacitor Co and, as the switch SW1 is turned onto the contact B side, the stored charge in the capacitor Co is discharged to the lamp L, and such lamp current as shown in (d) is made to flow therethrough. At time t3, the polarity of the AC source voltage $V_{AC}$ is reversed and, at time t4, exceeds the voltage $V_{L2}$ to have the switch SW2 turned onto the contact F side, and the switch SW1 is thereby turned over to have the energy supplied to the discharge lamp L. Next, at time t5, the switch SW2 is turned onto the contact E side, the same state as that at time t1 is reached again at time t6, and, thereafter, the foregoing operation is repeated to have the discharge lamp L smoothly operated.

EXAMPLE 29

Figure 54:
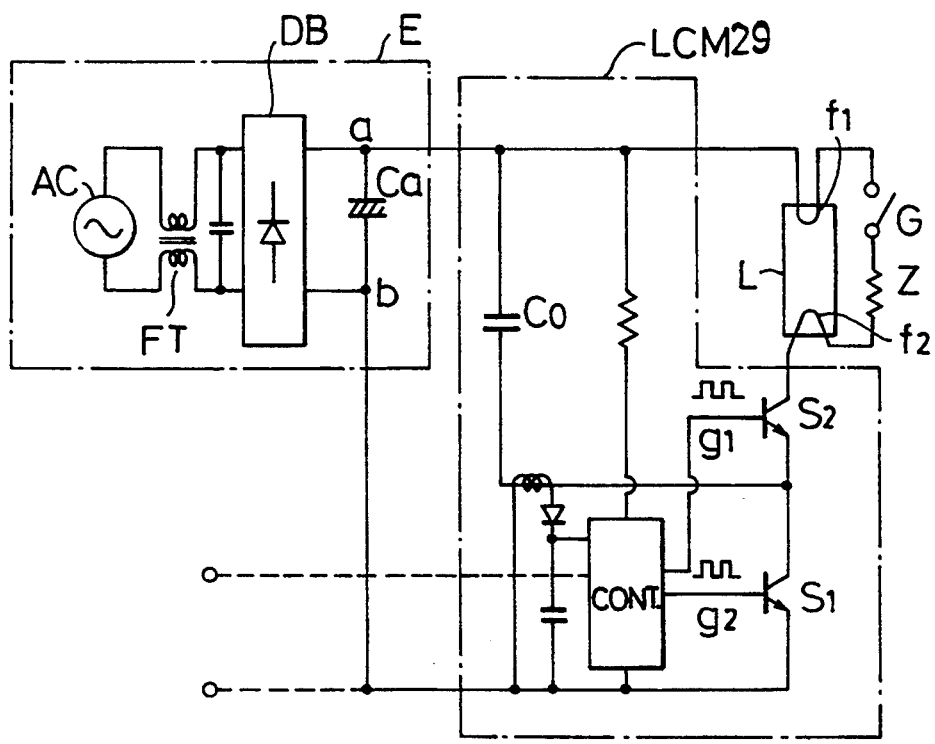
FIG. 54 is a circuit diagram showing twenty-ninth embodiment of the apparatus according to the present invention.

In a twenty-ninth embodiment shown in FIG. 54, a DC power source voltage E is obtained by subjecting a commercial AC source voltage AC passed through a noise preventing filter FT to a full-wave rectification at a rectifier DB and then to a smoothing at a smoothing condensor Ca, and a DC output thus obtained drives the operating means LCM29. This operating means LCM29 connects the capacitor Co through a charging switch S1 consisting of a transistor to output ends of the DC power source E and also connects discharge lamp L through a discharging switch S2 consisting of a transistor to both ends of the capacitor Co. Across the output ends of the DC power source E, further, a control means CONT is connected so that, with sequential application of such pulses g1 and g2 of pulse widths T1 and T2 as shown by waveforms (a) and (b) in FIG. 55 to the bases of the charging and discharging switches S1 and S2, these switches S1 and S2 are alternately turned ON and OFF.

Now, as the charging switch S1 is turned ON, the capacitor Co is first charged through a path from positive pole "a" of the power source E through the capacitor Co and charging capacitor S1 to negative pose "b" of the source, the charging switch S1 is turned OFF upon reversing of the pulses g1 and g2, then the discharging switch S2 is turned ON, and the charge in the capacitor Co is discharged through the discharge lamp L and discharging switch S2. Here, a starting switch G is connected through an impedance element Z to terminals, which are not connected to the operating means LCM of the filaments f1 and f2 of the discharge lamp L so that, as this starting switch G is made ON upon starting of the lamp, the discharged energy of the capacitor Co will be made to flow through the filament f1, starting switch G, impedance element Z, filament f2 and discharging switch S2 so as to preheat the filaments f1 and f2, the starting switch G is turned OFF when the discharge lamp L is fully preheated, and the discharge lamp L can be smoothly operated.

Figure 55:
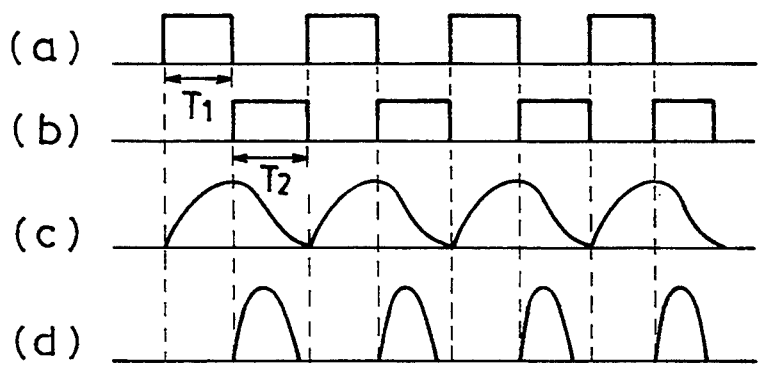
FIGS. 55 and 56 show in waveform diagrams different states of the operation at main parts in the circuit of FIG. 54.
Figure 56:
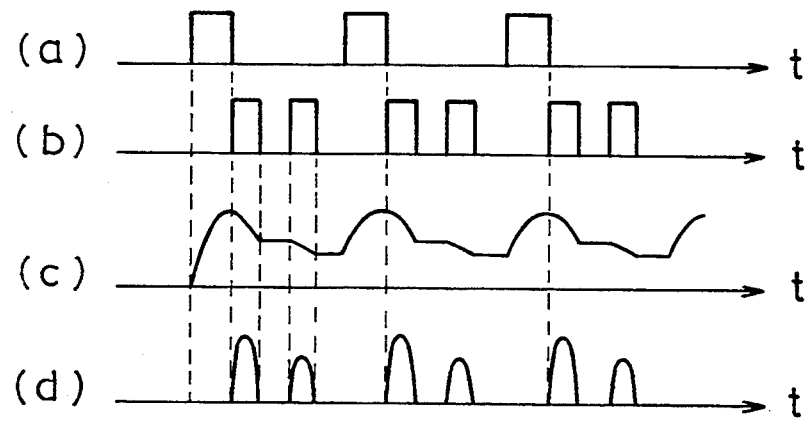

Accordingly, the discharge lamp L can be stably operated with the lamp current $I_L$ resulting from such repetitive discharging of the capacitor Co as shown by (c) of FIG. 55 and made to flow through the discharge lamp L as shown in (d) of FIG. 55. When on the other hand such high-intensity and high-voltage discharge lamp as HID lamp is employed as the discharge lamp L, there arises a risk that the operating becomes unstable due to acoustic resonance caused depending on the operating frequency, but this risk can be effectively avoided by generating the pulse g2 several times during each non-generating interval of the pulse g1 as shown by waveforms (a) and (b) of FIG. 56 so that the turning ON of the discharging switch S2 will be made as divided into several times with respect to each turning ON of the charging switch S1 responsive to the pulse g1, and the operating frequency can be thereby raised. In this case, it is also made possible to avoid any actuation by an audible frequency, by dividing the charging of the capacitor Co, that is, the turning ON and OFF of the charging switch S1 into several times while rendering the discharging switch S2 to turn ON once for a discharging. Further, it is possible to restrain an occurrence of any undesirable frequency, by means of an optimum combination of single charging and plurally divided chargings of the capacitor Co with single discharging and plurally divided discharging of the capacitor Co. In this connection, it will be appreciated that the capacitor Co is discharged upon turning ON of the discharging switch S2, and a timing signal for alternately turning ON and OFF both of these switches S1 and S2 can be obtained by detecting the discharged current.

EXAMPLE 30

Figure 57:
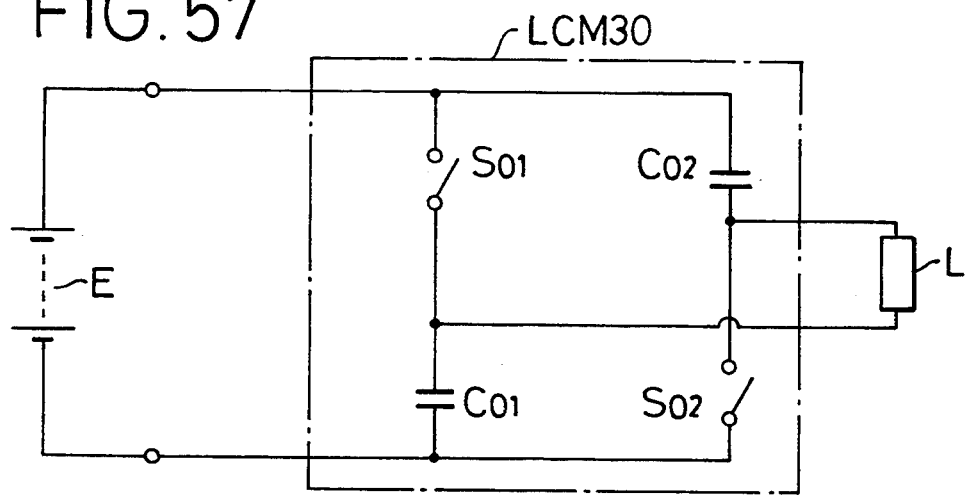
FIG. 57 shows in a circuit diagram thirtieth embodiment of the apparatus according to the present invention.
Figure 58:
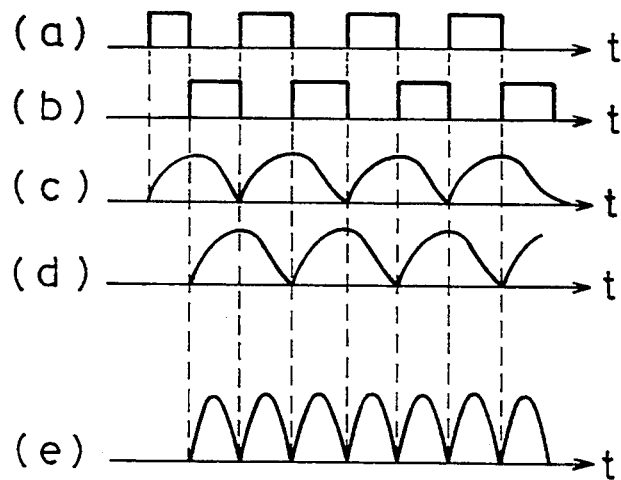
FIG. 58 shows in waveform diagrams the operation at main parts in the circuit of FIG. 57.

In a thirtieth embodiment shown in FIG. 57, two switches $S_{01}$ and $S_{02}$ and two capacitors $C_{01}$ and $C_{02}$ are employed in a bridge connection, in which the capacitor $C_{01}$ is connected through the switch $S_{01}$ to the DC power source E while the other capacitor $C_{02}$ is connected through the switch $S_{02}$ also to the DC power source E, and the discharge lamp L is inserted between a junction point of the switch $S_{01}$ to the capacitor $C_{01}$ and a junction point of the capacitor $C_{02}$ to the switch $S_{02}$. Referring to the operation in conjunction with waveforms (a) to (e) of FIG. 58, both switches $S_{01}$ and $S_{02}$ are provided for alternate turning ON and OFF as in (a) and (b) so that, as the switch $S_{01}$ is turned ON while the switch $S_{02}$ is turned OFF, such current as in (c) flows from the source E through the switch $S_{01}$ to the capacitor $C_{01}$ to have same thereby charged, upon which the switch $S_{01}$ functions as the charging switch for the capacitor $C_{01}$.

As the switch $S_{01}$ is turned OFF while the switch $S_{02}$ is turned ON next, such current as in (d) flows from the source E through the switch $S_{02}$ to the capacitor $C_{02}$ to charge it, and at the same time the charge in the capacitor $C_{01}$ already stored therein is discharged through a path of the discharge lamp L and switch $S_{02}$. Here, the switch $S_{02}$ functions as the charging switch for the capacitor $C_{02}$ and as the discharging switch for the capacitor $C_{01}$. Then, as the switch $S_{01}$ is turned ON while the switch $S_{02}$ is turned OFF, the current from the source E flows through the switch $S_{01}$ to the capacitor $C_{01}$ to charge the same again and, at the same time, the charge in the capacitor $C_{02}$ is discharged through a path of the discharge lamp L and discharging switch $S_{01}$. That is, the switch $S_{01}$ functions as the charging switch for the capacitor $C_{01}$ and also as the discharging switch for the capacitor $C_{02}$.

With repetition of the above operation, the discharging of the capacitors $C_{01}$ and $C_{02}$ causes such lamp current $I_L$ as in (e) to flow through the discharge lamp L to have the same operation. While in the present embodiment the pulse-shaped direct current is made to flow through the discharge lamp, it is readily possible to alternately change the polarity, if desired, by employing such polarity inverting means as has described in the foregoing embodiments.

EXAMPLE 31

Figure 59:
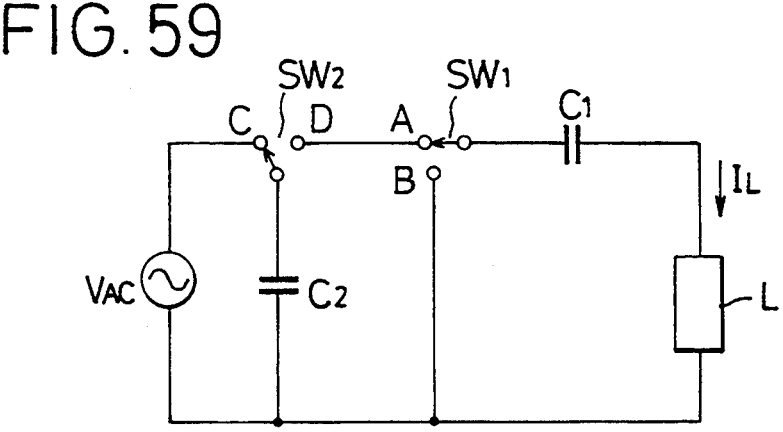
FIG. 59 shows in a circuit diagram thirty-first embodiment of the apparatus according to the present invention.
Figure 60:
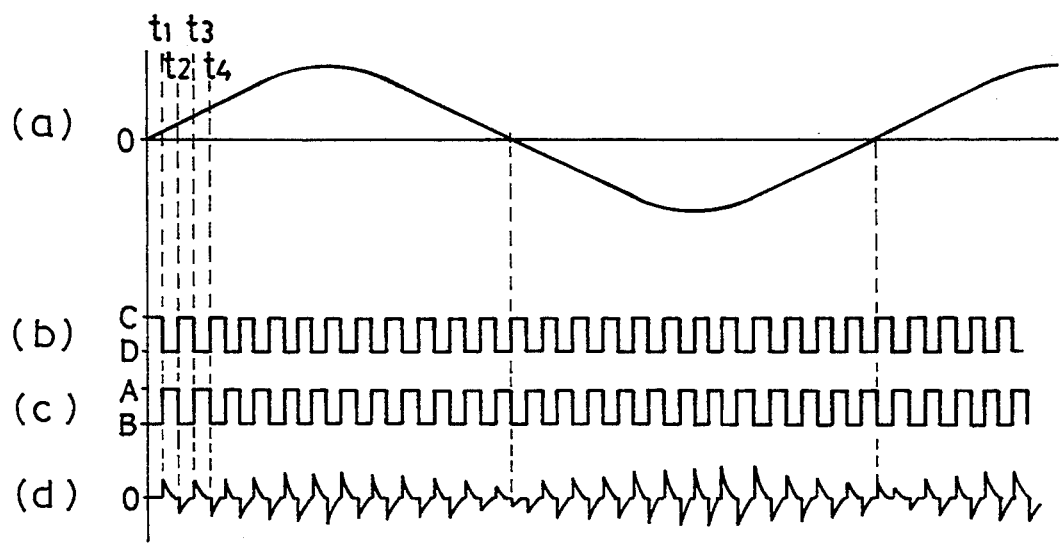
FIG. 60 shows in waveform diagrams the operation at main parts in the circuit of FIG. 59.

In a thirty-first embodiment shown in FIG. 59, the apparatus is so arranged that such AC source voltage $V_{AC}$ as shown by a waveform (a) of FIG. 60 is once stored in the capacitor C2 and is then supplied to the discharge lamp L through the switch SW1 and capacitor C1. When, at time t1, the switch SW2 is on its contact D side as in (b) of FIG. 60 while the switch SW1 is on its contact A side as in (c) of FIG. 60, the charge stored in the capacitor C2 is supplied to the switch SW1 and is applied through the capacitor C1 to the discharge lamp L, and such lamp current $I_L$ as in (d) of FIG. 60 flows through the discharge lamp L. At time t2, next, the switch SW2 is turned onto its contact C side while the switch SW1 is turned onto its contact B side, then the AC source voltage $V_{AC}$ is applied to the capacitor C2, while the charge in the capacitor C1 is applied to the discharge lamp L so that the lamp current $I_L$ in a direction reverse to that in the above will flow therethrough, and the lamp can be smoothly AC-operated.

According to this arrangement, the energy supplied from the capacitor C2 to the capacitor C1 can be easily controlled by the capacitor C2. For the switch operation upon at least the energy supply, it suffices the purpose that the switch SW2 is on the contact B side while the switch SW1 is on the contact A side.

EXAMPLE 32

Figure 61:
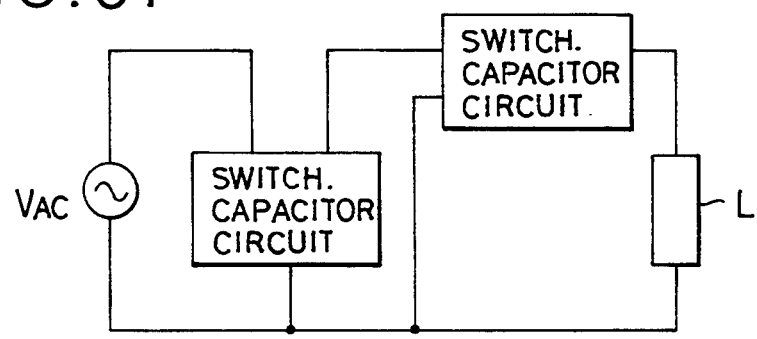
FIGS. 61 and 62 are circuit diagrams of thirty-second and thirty-third embodiments of the apparatus according to the present invention.

In a thirty-second embodiment of FIG. 61, the apparatus for operating discharge lamps comprises capacitors C1 and C2, switches SW1 and SW2 and a plurality of capacitors, and a stable supply of a predetermined voltage to the discharge lamp L can be realized while realizing voltage boosting and lowering with the switch and capacitors.

EXAMPLE 33

Figure 62:
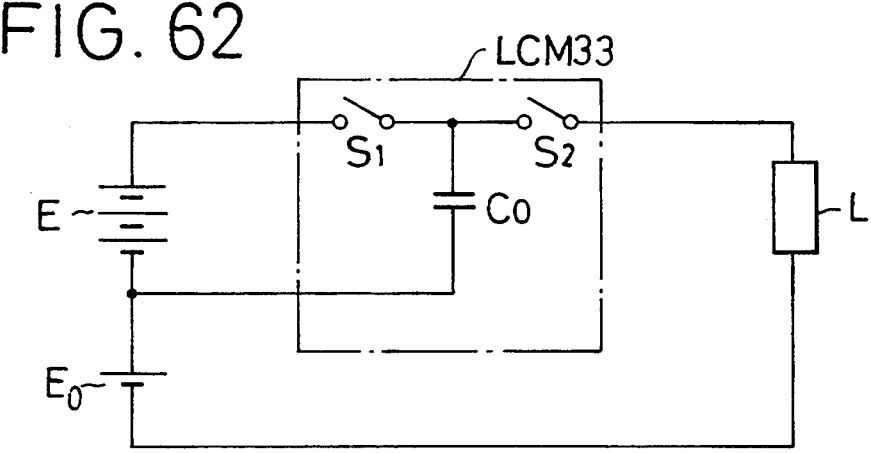
Figure 63:
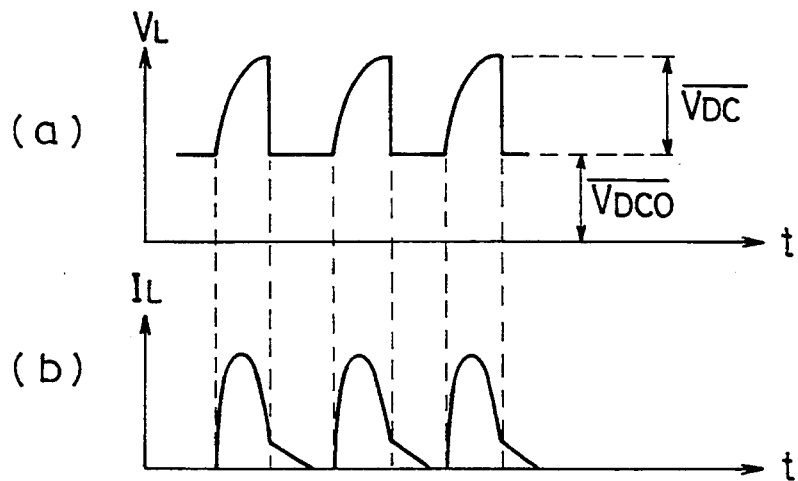
FIG. 63 shows in waveform diagrams the operation of the circuit of FIG. 60.

In the apparatus according to a thirty-third embodiment shown in FIG. 62, an operating means LCM33 of the same arrangement as that in, for example, the foregoing embodiment of FIG. 2 is employed and, to the DC power source of this operating means LCM33, a further DC power source $E_0$ is connected in series. For the further DC power source $E_0$, there is employed one of a lower voltage value than the steady-state voltage in order that the current to the discharge lamp L keeps increasing when the voltage $V_{DC0}$ of this further source $E_0$ is directly connected to the discharge lamp L. With an application of the voltage $V_{DC0}$ from the further source $E_0$ to the operating means LCM33, the lamp voltage $V_L$ is caused to vary between a sum voltage of the voltages $V_{DC}$ and $V_{DC0}$ of both power sources E and $E_0$ and the further source's voltage $V_{DC0}$ as shown in waveform diagram (a) of FIG. 63. At this time, the lamp current $I_L$ is caused to flow for a certain period as being gradually decreased as in (b) of FIG. 63 by the voltage $V_{DC0}$ slightly lower than the steady-state voltage of the discharge lamp L even when the output voltage of the operating means LCM33 become zero due to the discharging of the capacitor Co since, for a short period at this very moment, the discharge lamp L is still in active state. The lamp current $I_L$ at this time is not to be increased since the voltage $V_{DC0}$ is below the steady-state voltage, and the current limiting effect by means of the capacitor Co is realized. Further, the voltage of the DC power source may be of such a level that the sum of this voltage and that of the further DC power source $E_0$ will be slightly higher than the steady-state voltage, and the voltage to which the further source $E_0$ is subjected may be set lower.

EXAMPLE 34

Figure 64:
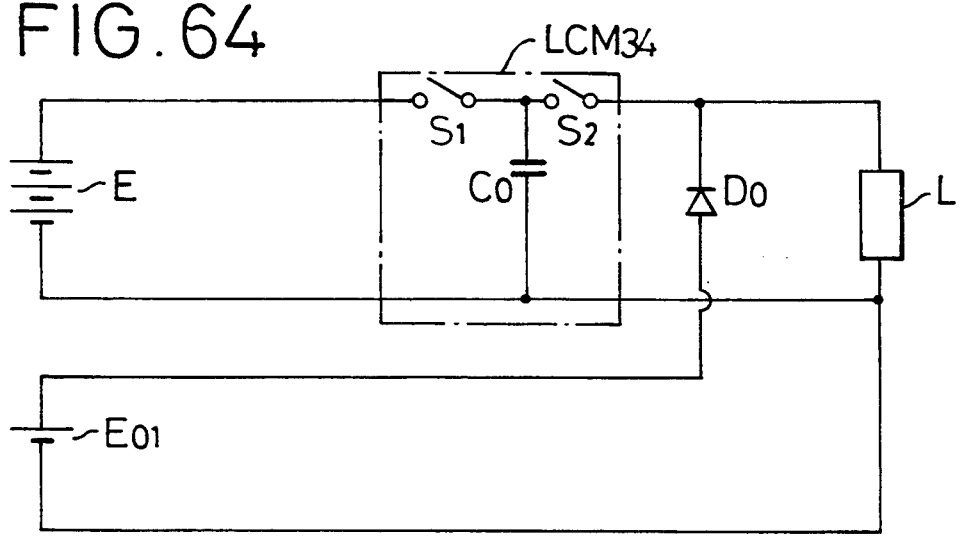
FIG. 64 is a circuit of thirty-fourth embodiment of the apparatus according to the present invention.

In the apparatus of a thirty-fourth embodiment of FIG. 64, the further DC power source $E_{01}$ is connected in parallel and through a diode Do across both output ends of the operating means LCM34. In this embodiment, the discharge lamp L can be kept in active state by the further DC power source $E_{01}$ in intermediate period between the discharging of the capacitor Co in the operating means LCM34 and its next discharging, so that the number of ions inside the discharge lamp L can be maintained large, the light output of the lamp can be made smooth involving no flickering or the like, the operating means LCM34 can be minimized in size as in the foregoing thirty-third embodiment in addition to that the means can be reduced in weight and loss, and parts relatively low in the resistance-to-current property can be made employable for the charging and the discharging switch.

While in the foregoing embodiments the use of the transistor as the charging switch, discharging switch and so on has been referred to only in some of the various embodiments, it is possible to employ semiconductor switching elements including the transistors for the switches in any one of the embodiments, if so required.

Figure 65A:
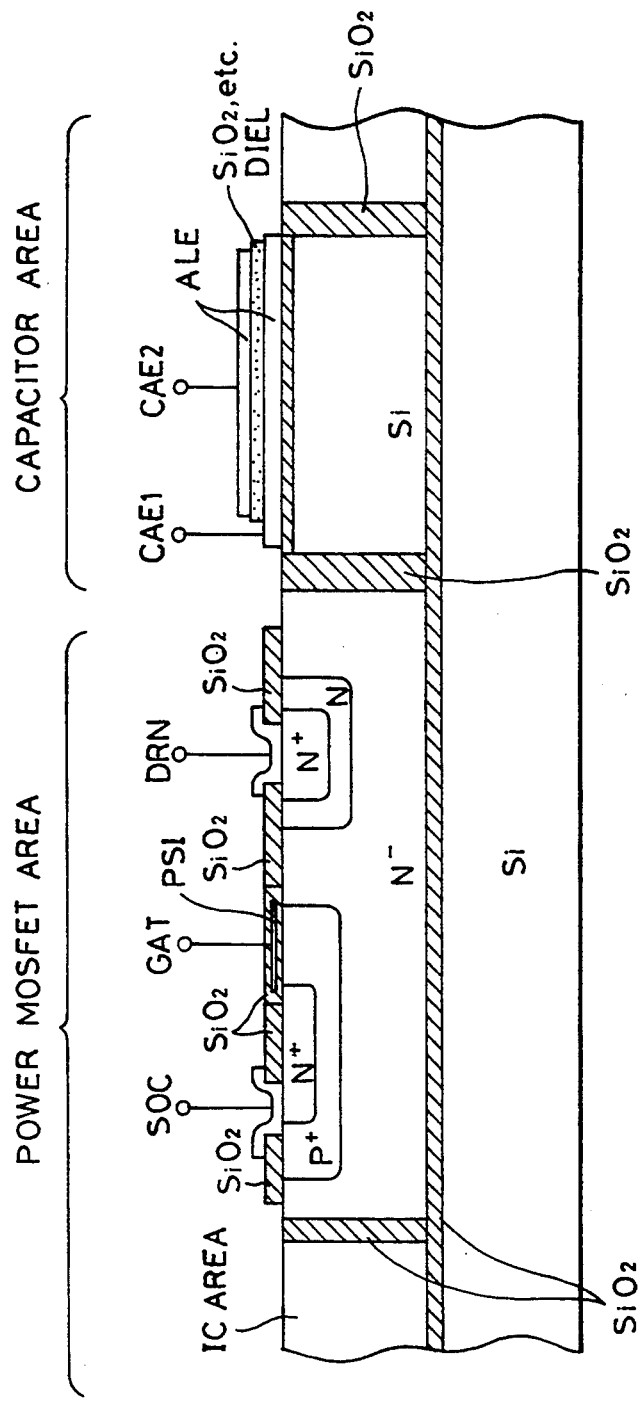

In FIGS. 65A and 65B, examples of semiconductor devices in which main parts of the apparatus for operating discharge lamps in the third embodiment shown in FIG. 7 are formed on semiconductor substrate. More specifically, there is shown in FIG. 65A a device including a power MOSFET formed on a dielectric isolation substrate with a source SOC, gate GAT and drain DRN as the switch 31 in the third embodiment, together with a capacitor formed flatly on the same substrate. In FIG. 65B, on the other hand, there is shown a device in which, in contrast to the capacitor shown in FIG. 65A to be formed flat on the substrate in a so-called flat capacitor type, the capacitor is formed in a vertical trench shape by means of dry etcher or the like in the same substrate and with sequentially formed silicon oxide surface, aluminum electrode and so on in inner wall of the vertical trench, in parallel relationship to the power MOSFET.

In this case, the power MOSFET and capacitor are completely insulated from each other by a silicon oxide film, even when the number of these elements is large. According to the present invention, further, the operating means does not include such elements as inductors which are unable to be minimized in size, so that the constituent elements designed for desired values can be easily installed on the same dielectric isolation substrate so as to allow the apparatus to be formed in one chip.

In FIGS. 65A and 65B, further, reference symbols are such that CAE is the capacitor, ALE is the aluminum electrode, PSI is a polysilicon layer, and DIEL is the dielectric isolation substrate of $SiO_2$ or the like. In fabricating the respective parts of the device shown in FIGS. 65A and 65B including the dielectric isolation substrate and, in particular, in forming them into one chip, every known semiconductor manufacturing techniques can be effectively employed.

What is claimed is:

1. An apparatus for stably lighting discharge lamps comprising:

input power source having first and second ends;

capacitor means having first and second ends respectively coupled to said first and second ends of said input power source, establishing a first closed loop;

capacitor charging means including a first switch means repeatedly turned ON and OFF at a first frequency and coupled to said first closed loop between one of said first and second ends of said input power source and one of said first and second ends of said capacitor means;

a discharge lamp directly connected across said first and second ends of said capacitor means establishing a second closed loop;

capacitor discharging means including a second switch means and coupled to said second closed loop between one of said first and second ends of said capacitor means and said discharge lamp, said second switch means being repeatedly turned ON and OFF at a second frequency; and control means connected to said first and second switch means for controlling ON/OFF operation of said first and second switch means so that said first and second switch means are not simultaneously turned ON, said control means controlling said first and second switch means for storing charge within said capacitor means when said first switch means is turned ON and said second switch means is turned OFF and for controlling said first and second switch means for discharging stored charge from said capacitor means through said discharge lamp by keeping said second switch means turned ON and said first switch means turned OFF until substantial termination of a lamp current flowing through said discharge lamp, thereby limiting an over lamp current and cyclically supplying a pulsed lamp current to said discharge lamp for flickerless operation wherein the second frequency exceeds a critical fusion frequency for eliminating flicker.

2. The apparatus according to claim 1 wherein said capacitor means comprises:
a plurality of capacitors; and
converting means for connecting said plurality of capacitors in a series connection having a first capacity across said discharge lamp and for connecting said plurality of capacitors in a parallel connection having a second capacity across the first and second ends of said input power source, the second capacity being different from the first capacity, wherein said converting means is a voltage boosting/lowering means for changing a voltage applied to said discharge lamp in accordance with the second capacity, said voltage boosting/lowering means producing a first high voltage for starting a discharge of said discharge lamp and producing a second voltage, lower than the first high voltage, for maintaining the discharge.

3. The apparatus according to claim 1 including a second discharge lamp connected in said first closed loop between said input power source and said capacitor means.

4. The apparatus according to claim 1 wherein said control means controls the first and second frequencies for controlling light emission of said discharge lamp.

5. The apparatus according to claim 1 wherein said first and second switch means respectively include a plurality of pairs of third and fourth switch means, said plurality of pairs of third and fourth switch means being turned ON and OFF with sequential time lags.

6. The apparatus according to claim 1 wherein said second switch means comprises first, second, third, and fourth transistors connected in a bridge configuration, said bridge configuration including a first junction point of said first and second transistors and a second junction point of said third and fourth transistors, wherein said discharge lamp is connected between said first and second junction points, said control means turning ON and OFF said first, second, third, and fourth transistors for AC operation of said discharge lamp.

7. The apparatus according to claim 1 wherein said control means controls ON/OFF operation of the first and second switch means to occur at a frequency of about 1 MHz, for substantially sequential generation of light output from said discharge lamp.

8. The apparatus according to claim 1 wherein said capacitor means comprises a plurality of capacitors and means for changing connection of said plurality of capacitors between a series charging connection and a parallel discharging connection, wherein said capacitors are in said series charging connection for charging when said first switch means is ON and said capacitors are in said parallel discharging arrangement for discharging when said second switch means is ON.

9. The apparatus according to claim 8 wherein said means for changing comprises diodes.

10. The apparatus according to claim 1 wherein said capacitor means comprises a plurality of capacitors and means for changing over a connecting arrangement of said plurality of capacitors between a parallel changing arrangement and a series discharging arrangement, wherein said capacitors are in said parallel arrangement for charging when said first switch means is ON and said capacitors are in said series arrangement for discharging when said second switch means is ON.

11. The apparatus according to claim 10 wherein said means for changing comprises diodes.

12. The apparatus according to claim 1 wherein said discharge lamp is a high-intensity, high-voltage discharge lamp, and the second operating frequency of said second switch means is a frequency that does not generate an acoustic resonance causing unstable operation of said discharge lamp.

13. An apparatus for stably lighting fluorescent lamps comprising:
an input power source having first and second ends;
capacitor means having first and second ends respectively coupled to said first and second ends of said input power source, establishing a first closed loop;
capacitor charging means including a first switching transistor repeatedly turned ON and OFF at a first frequency and coupled to said first closed loop between one of said first and second ends of said input power source and one of said first and second ends of said capacitor means;
a fluorescent lamp connected directly across said first and second ends of said capacitor means, establishing a second closed loop;
capacitor discharging means including a second switch and coupled to said second closed loop between one of said first and second ends of said capacitor means and said fluorescent lamp, said second switch being repeatedly turned ON and OFF at a second frequency; and
control means connected to said first switching transistor and said second switch for controlling ON/OFF operation of said first switching transistor and said second switch so that said first switching transistor and said second switch are not simultaneously turned ON, said control means controlling said first switching transistor and said second switch for storing charge within said capacitor means when said first switching transistor is turned ON and said second switch is turned OFF and for controlling said first switching transistor and said second switch for discharging stored charge from said capacitor means through said fluorescent lamp by keeping said second switch turned ON and said first switching transistor turned OFF until substantial termination of a lamp current flowing through said fluorescent lamp, thereby limiting a lamp current and cyclically supplying a pulsed lamp current to said fluorescent lamp for flickerless operation wherein said second frequency exceeds a critical fusion frequency for eliminating flicker.

14. The apparatus according to claim 13 wherein said second switch comprises first, second, third, and fourth transistors connected in a bridge configuration, said bridge configuration including a first junction point of said first and second transistors and a second junction point of said third and fourth transistors, wherein said fluorescent lamp is connected between said first and second junction points, said control means turning ON and OFF said first, second, third, and fourth transistors for AC operation of said fluorescent lamp.

15. The apparatus according to claim 13 comprising a third switching transistor connected across non-source side filaments of said fluorescent lamp, said third switching transistor being operated in a preheating period for supplying a preheating current to said filaments.

16. An apparatus for stably lighting discharge lamps comprising:
- a discharge lamp having a steady-state voltage;
- a first input power source producing a first voltage and having first and second ends;
- a second input power source producing a second voltage lower than the steady-state voltage of said discharge lamp, a sum of the first and second voltages being slightly higher than the steady-state voltage of said discharge lamp, said second input power source being connected in series with said first input power source;
- capacitor means having first and second ends respectively coupled to said first and second ends of said first input power source, establishing a first closed loop;
- capacitor charging means including first switch means repeatedly turned ON and OFF at a first frequency and coupled to said first closed loop between one of said first and second ends of said first input power source and one of said first and second ends of said capacitor means, wherein said discharge lamp is connected directly across said second input power source and said capacitor means, establishing a second closed loop;
- capacitor discharging means including second switch means, interposed in said second closed loop, and including a series circuit of said second input power source, said capacitor means and said discharge lamp, said second switch means being repeatedly turned ON and OFF at a second frequency; and
- control means connected to said first and second switch means for controlling ON/OFF operation of said first and second switch means so that said first and second switch means are not simultaneously turned ON, said control means controlling said first and second switch means for storing charge within said capacitor means when said first switch means is turned ON and said second switch means is turned OFF and for controlling said first and second switch means for discharging stored charge from said capacitor means through said discharge lamp by keeping said second switch means turned ON and said first switch means OFF until substantial termination of a lamp current flowing through said discharge lamp, thereby limiting a lamp current and cyclically supplying a pulsed lamp current to said discharge lamp for flickerless operation wherein the second frequency exceeds a critical fusion frequency for eliminating flicker.

17. An apparatus for stably lighting discharge lamps comprising:
- a discharge lamp having a steady-state voltage;
- a first input power source producing a first voltage and having first and second ends;
- a second input power source producing a second voltage lower than the steady-state voltage of said discharge lamp, a sum of the first and second voltages being slightly higher than the steady-state voltage, and said second input power source being connected in parallel through a diode to said first input power source;
- capacitor means having first and second ends respectively coupled to said first and second ends of said first input power source, establishing a first closed loop;
- capacitor charging means including first switch means repeatedly turned ON and OFF at a first frequency and coupled to said first closed loop between one of said first and second ends of said first input power source and one of said first and second ends of said capacitor means, wherein said discharge lamp is connected directly across said second input power source and said capacitor means, establishing a second closed loop;
- capacitor discharging means including second switch means, and interposed in said second closed loop, and including a series circuit of said second input power source, said diode, and said discharge lamp, said second switch means being repeatedly turned ON and OFF at a second frequency; and
- control means connected to said first and second switch means for controlling ON/OFF operation of said first and second switch means so that said first and second switch means are not simultaneously turned ON, said control means controlling said first and second switch means for storing charge within said capacitor means when said first switch means is turned ON and said second switch means is turned OFF and for controlling said first and second switch means for discharging stored charge from said capacitor means through said discharge lamp by keeping said second switch means turned ON and said first switch means turned OFF until substantial termination of a lamp current flowing through said discharge lamp, thereby limiting a lamp current and cyclically supplying a pulsed lamp current to said discharge lamp for flickerless operation wherein the second frequency exceeds a critical fusion frequency for eliminating flicker.

* * * * *